United States Patent
Pan

(10) Patent No.: US 11,068,058 B2
(45) Date of Patent: Jul. 20, 2021

(54) CONTROL METHOD AND IMMERSIVE SYSTEM FOR GENERATING HAPTIC FEEDBACK

(71) Applicant: HTC Corporation, Taoyuan (TW)

(72) Inventor: Sheng-Yang Pan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 26 days.

(21) Appl. No.: 16/032,080

(22) Filed: Jul. 11, 2018

(65) Prior Publication Data

US 2019/0018489 A1 Jan. 17, 2019

Related U.S. Application Data

(60) Provisional application No. 62/530,861, filed on Jul. 11, 2017.

(51) Int. Cl.
*G06F 3/01* (2006.01)
*G06F 3/0484* (2013.01)
(Continued)

(52) U.S. Cl.
CPC ............ *G06F 3/016* (2013.01); *B06B 1/023* (2013.01); *B06B 1/0215* (2013.01);
(Continued)

(58) Field of Classification Search
CPC ...... G06F 3/016; G06F 3/04842; G06F 3/011; G06F 3/0346; G06F 2203/012;
(Continued)

(56) References Cited

U.S. PATENT DOCUMENTS

| 6,417,638 B1 * | 7/2002 | Guy ..................... B25J 9/1692 |
| | | 318/560 |
| 10,296,086 B2 * | 5/2019 | Rimon ................... G06F 3/014 |

(Continued)

FOREIGN PATENT DOCUMENTS

| CN | 101496954 B | 11/2012 |
| CN | 103425245 A | 12/2013 |

(Continued)

OTHER PUBLICATIONS

Choi et. al., "Grabity: A Wearable Haptic Interface for Simulating Weight and Grasping in Virtual Reality", UIST 2017, Oct. 25, 2017, hereinafter Grabity.*

(Continued)

*Primary Examiner* — Matthew Ell
(74) *Attorney, Agent, or Firm* — CKC & Partners Co., LLC

(57) ABSTRACT

An immersive system includes a processing device. The processing device is communicated with an interface device and an electronic display in a head mounted display device. The interface device includes a haptic feedback circuit. The haptic feedback circuit is configured to induce a haptic feedback. The interface device includes a haptic feedback circuit. The haptic feedback circuit is configured to induce a haptic feedback. The processing device is configured to provide an immersive content to the electronic display. The processing device is configured to identify a simulated object corresponding to the interface device in the immersive content, and identify an interaction event occurring to the simulated object in the immersive content. The processing device is configured to determine a vibration pattern according to the interaction event and the simulated object, and control the haptic feedback circuit to induce the haptic feedback according to the vibration pattern.

12 Claims, 17 Drawing Sheets

(51) Int. Cl.
*G02B 27/01* (2006.01)
*G06F 3/0346* (2013.01)
*B06B 1/02* (2006.01)
*B06B 1/04* (2006.01)

(52) U.S. Cl.
CPC .......... *B06B 1/0269* (2013.01); *G02B 27/017* (2013.01); *G06F 3/011* (2013.01); *G06F 3/0346* (2013.01); *G06F 3/04842* (2013.01); *B06B 1/04* (2013.01); *B06B 2201/53* (2013.01)

(58) Field of Classification Search
CPC ......... B06B 1/023; B06B 1/0269; B06B 1/04; B06B 2201/53; B06B 1/0215; G02B 27/017
See application file for complete search history.

(56) References Cited

U.S. PATENT DOCUMENTS

| | | | |
|---|---|---|---|
| 2004/0164960 A1* | 8/2004 | Jacobus | B25J 9/1689 345/161 |
| 2013/0318437 A1* | 11/2013 | Jung | G06F 3/0488 715/251 |
| 2016/0042566 A1 | 2/2016 | Mao | |
| 2016/0274662 A1 | 9/2016 | Rimon et al. | |
| 2016/0357257 A1* | 12/2016 | Lim | G06F 3/041 |

FOREIGN PATENT DOCUMENTS

| | | |
|---|---|---|
| CN | 105117016 A | 12/2015 |
| TW | 201642943 A | 12/2016 |

OTHER PUBLICATIONS

Basdogan, "Principles of Haptic Rendering for Virtual Environments", Jul. 9, 2017 available at https://web.archive.org/web/20170709131030/http://portal.ku.edu.tr/~cbasdogan/Tutorials/haptic_tutorial.html.*
Corresponding Taiwan office action dated Jun. 19, 2019.
Corresponding Chinese office action dated Apr. 1, 2021.

* cited by examiner

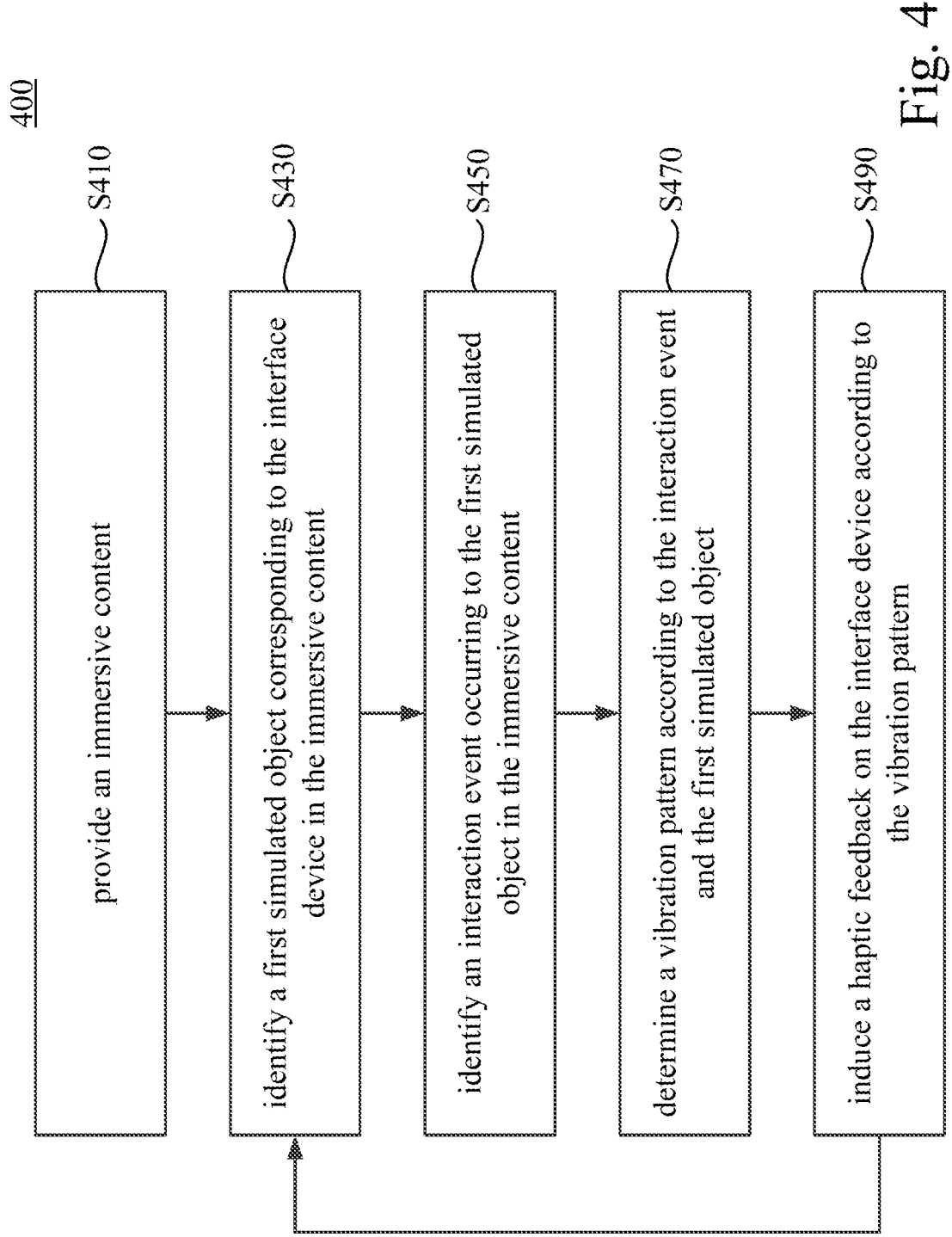

CONTROL METHOD AND IMMERSIVE SYSTEM FOR GENERATING HAPTIC FEEDBACK

CROSS-REFERENCE TO RELATED APPLICATION

This application claims priority to U.S. Provisional Application Ser. No. 62/530,861, filed on Jul. 11, 2017, which is herein incorporated by reference.

BACKGROUND

Field of Invention

Present disclosure relates to an immersive system and a control method thereof. More particularly, the present disclosure relates to an immersive system capable of generating a haptic feedback based on an interaction event.

Description of Related Art

Recently, applications for virtual reality (VR), augmented reality (AR), substitutional reality (SR) or mixed reality (MR) experiences are well developed. Various solutions, including high-end systems (e.g., HTC VIVE) to low-cost systems (e.g., google cardboard), are introduced to provide VR, AR, SR or MR experiences to users. One important feature of the VR, AR, SR or MR system is to provide experiences (including visions, sounds, smells and/or touches) as real as possible to a user. Haptic feedback is an important part of these experiences.

SUMMARY

An embodiment of the disclosure provides an immersive system, which includes a processing device. The processing device is communicated with an interface device and an electronic display in a head mounted display device. The interface device includes a haptic feedback circuit. The haptic feedback circuit is configured to induce a haptic feedback. The processing device is configured to provide an immersive content to the electronic display. The processing device is configured to identify a first simulated object corresponding to the interface device in the immersive content. The processing device is configured to identify an interaction event occurring to the first simulated object in the immersive content. The processing device is configured to determine a vibration pattern according to the interaction event and the first simulated object. The processing device is configured to control the haptic feedback circuit to induce the haptic feedback according to the vibration pattern.

Another embodiment of present disclosure is to provide a control method, which is suitable for an immersive system. The control method include following operations. An immersive content is provided. A first simulated object corresponding to an interface device is identified in the immersive content. An interaction event occurring to the first simulated object is identified in the immersive content. A vibration pattern is determined according to the interaction event and the first simulated object. A haptic feedback is induced on the interface device according to the vibration pattern.

Another embodiment of present disclosure is to provide a non-transitory computer-readable medium including computer program instructions. The computer program instructions when executed by a processor cause the processor to perform following operations. An immersive content is provided. A first simulated object corresponding to an interface device is identified in the immersive content. An interaction event occurring to the first simulated object is identified in the immersive content. A vibration pattern is determined according to the interaction event and the first simulated object. A haptic feedback is induced on the interface device according to the vibration pattern.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows:

FIG. 4 is a flow diagram illustrating a control method according to some embodiments of the disclosure.

DETAILED DESCRIPTION

Figure 1:
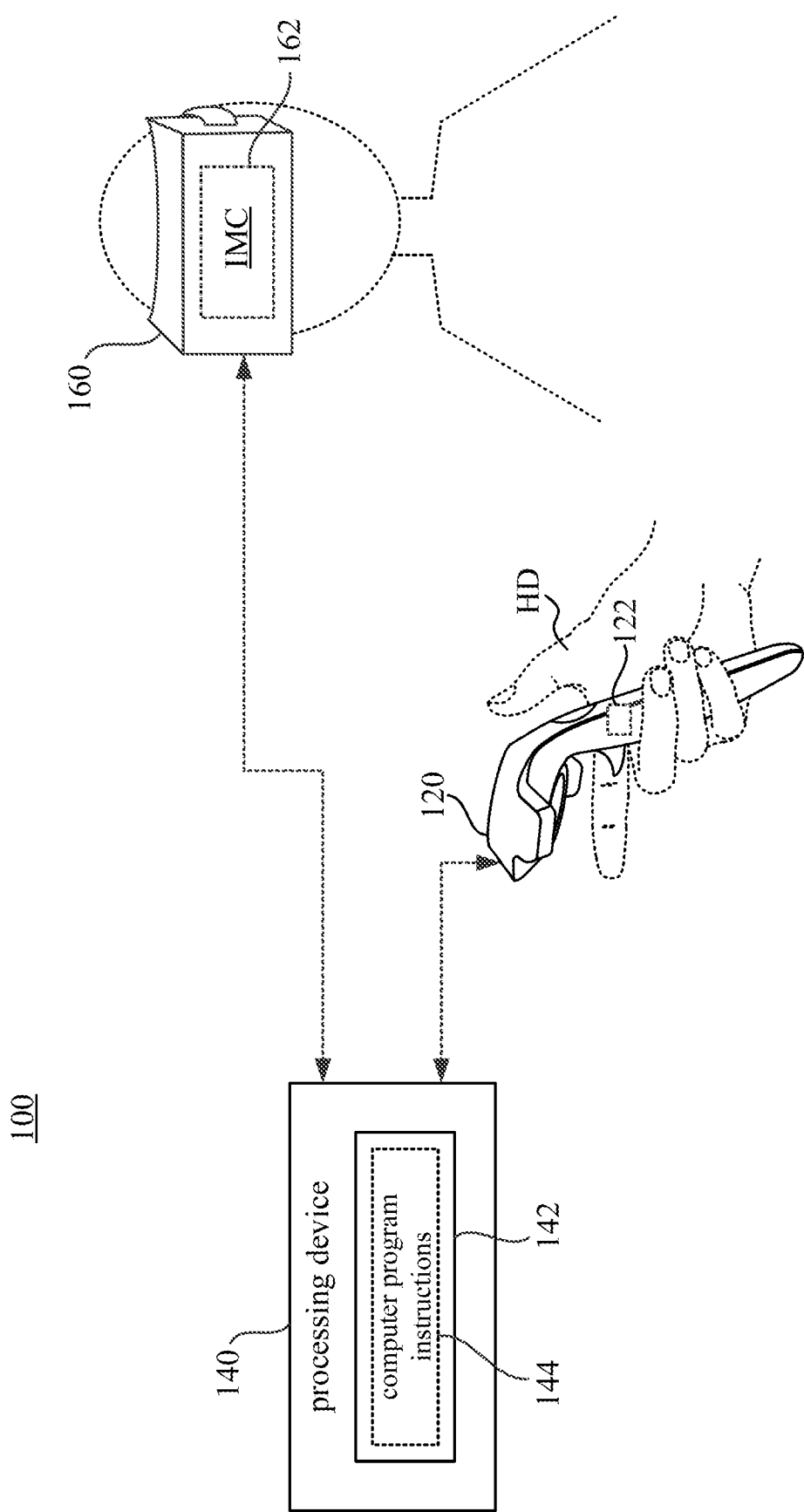
FIG. 1 is a schematic diagram illustrating an immersive system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Reference is made to FIG. 1. FIG. 1 is a schematic diagram illustrating an immersive system 100 according to some embodiments of the present disclosure. As illustrated in FIG. 1, in one embodiment, the immersive system 100 includes an interface device 120, a processing device 140 and a head mounted display (HMD) device 160.

In the embodiment shown in FIG. 1, the head mounted display device 160 includes an electronic display 162. The electronic display 162 is configured to present an immersive content IMC to a user wearing the head mounted display device 160. The immersive content IMC can be a parallax-processed and stereoscopic video (or streaming video) for providing virtual reality (VR), augmented reality (AR), substitutional reality (SR) or mixed reality (MR) experiences to the user.

As the embodiment shown in FIG. 1, the interface device 120 includes a hand-held controller hold in a hand HD of the user. The interface device 120 in some embodiments includes a haptic feedback circuit 122. The haptic feedback circuit 122 is configured to induce a haptic feedback to the hand HD of the user. For example, the haptic feedback circuit 122 can include one or more vibration actuator capable of inducing vibrations on the interface device 120. When some events occur or some situations happen in the immersive content IMC, a corresponding haptic feedback (e.g., the vibration induced by the haptic feedback circuit 122) can be generated and the user can feel the haptic feedback through his/her hand.

In the embodiments shown in FIG. 1, the interface device 120 is the hand-held controller hold in a hand HD of the user. However, the disclosure is not limited thereto.

In some other embodiments, the interface device (not shown in figures) can be a wearable apparatus worn on a body portion of a user. The haptic feedback circuit induces the haptic feedback to the body portion. In an example, the interface device can be a wristband worn on a wrist of the user, and the haptic feedback circuit induces the haptic feedback to the wrist, such that the user can feel the haptic feedback through the skin on his/her wrist. In another example, the interface device can be a vest worn on a torso of the user, and the haptic feedback circuit induces the haptic feedback to the torso, such the user can feel the haptic feedback through his/her chest or back. In still another example, the interface device can be a helmet worn on a head of the user, and the haptic feedback circuit induces the haptic feedback to the head, such the user can feel the haptic feedback through his/her head.

In the embodiment shown in FIG. 1, the processing device 140 is communicatively connected through a wireless connection (e.g., WiFi, Bluetooth, BLE or IR) or a wired connection (e.g., via a cable wiring) to the interface device 120 and the head mounted display device 160. The processing device 140 includes a processor 142. Computer program instructions 144 are executed by the processor 142 of the processing device 140. The processing device 140 can be a computer, a game console, a server or any equivalent device with computation ability. The processor 142 may be a CPU, GPU, ASIC or some control unit of the processing device 140. The computer program instructions 144 may be software or firmware executed by the processor 142. The processing device 140 is configured to provide the immersive content IMC to be displayed on the electronic display 162 of the head mounted display device 160.

Figure 2:
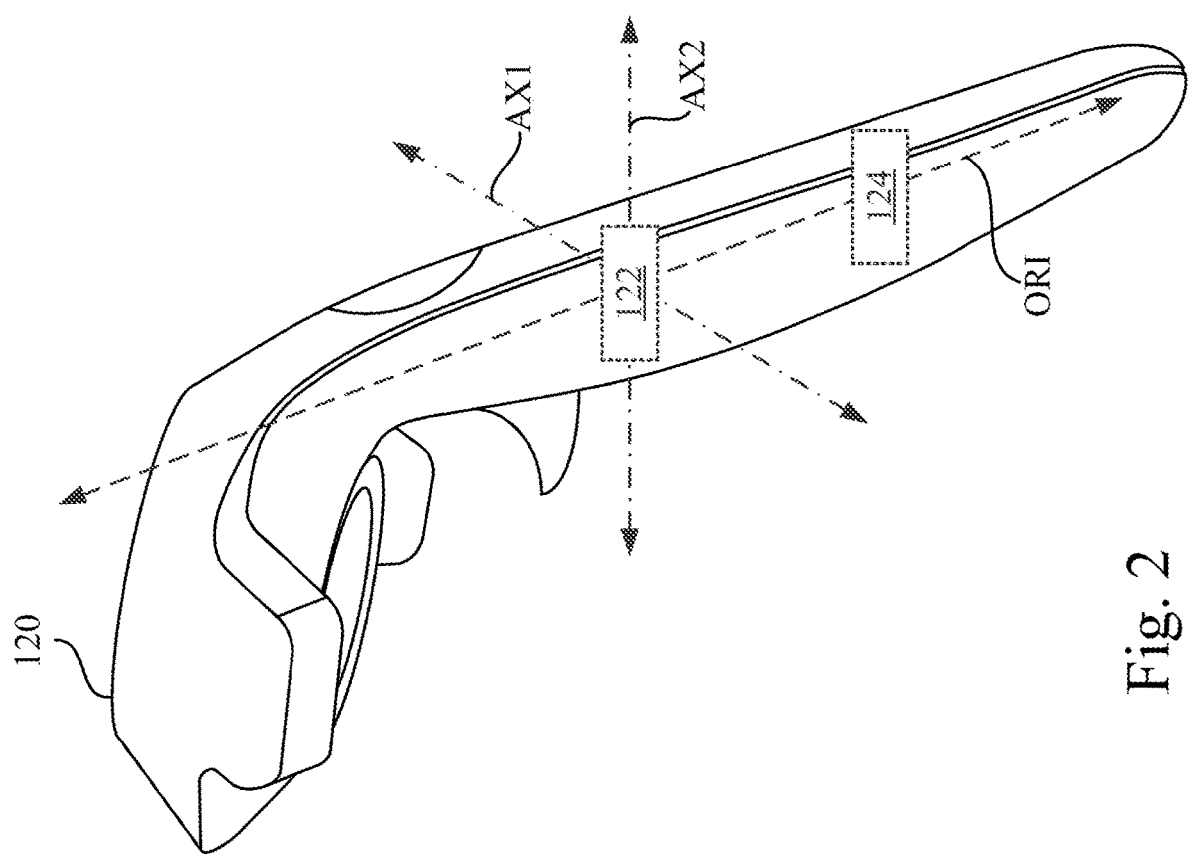
FIG. 2 is a schematic diagram illustrating a side view of the interface device of the immersive system in FIG. 1.
Figure 3A:
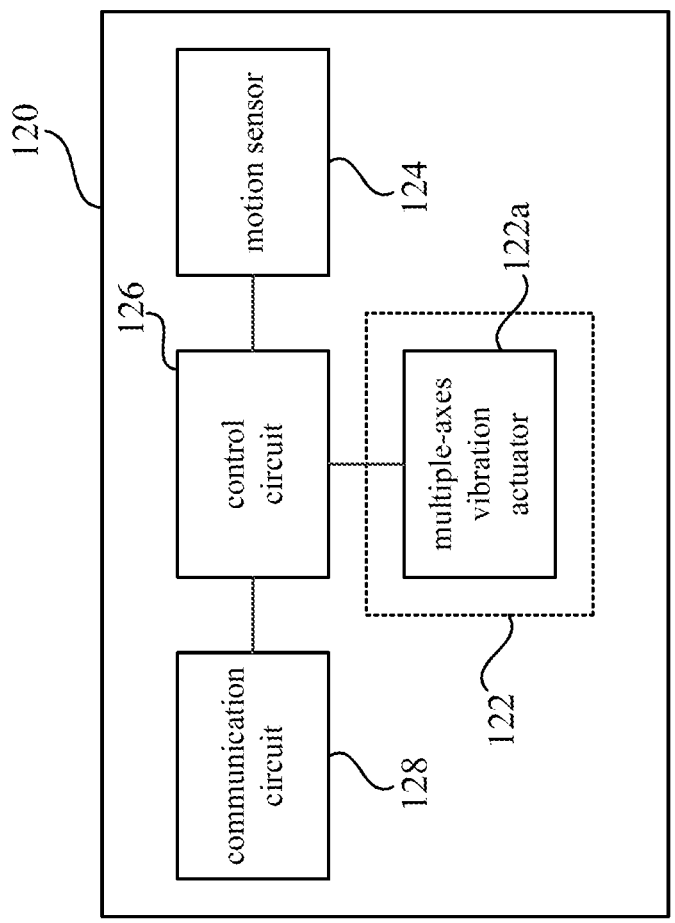
FIG. 3A is a functional block diagram illustrating the interface device according to an embodiment of the disclosure.

Reference is also made to FIG. 2 and FIG. 3A. FIG. 2 is a schematic diagram illustrating a side view of the interface device 120 of the immersive system 100 in FIG. 1. FIG. 3A is a functional block diagram illustrating the interface device 120 according to an embodiment of the disclosure.

As shown in FIG. 2 and FIG. 3A, the interface device 120 includes the haptic feedback circuit 122, a motion sensor 124, a control circuit 126 and a communication circuit 128. In the embodiment shown in FIG. 3A, the haptic feedback circuit 122 includes a multiple-axes vibration actuator 122a capable of vibrating at least along a first axis AX1 and a second axis AX2. The first axis AX1 and the second axis AX2 are orientated to different directions.

As the embodiment shown in FIG. 2, the first axis AX1 extends from the right side of the interface device 120 to the left side of the interface device 120, and the second axis AX2 extends from the front side of the interface device 120 to the back side of the interface device 120. In other words, the multiple-axes vibration actuator 122a is capable of driving the interface device 120 to vibrate side-to-side along the first axis AX1 and also driving the interface device 120 to vibrate back-and-forth along the second axis AX2. In this embodiment, the multiple-axes vibration actuator 122a is a two-axes vibration actuator capable of vibrating along the first axis AX1 and along the second axis AX2. For example, the two-axes vibration actuator can be implemented with an oscillator coil located between two electro-magnet terminals. The high-frequency signals are applied to these electro-magnet terminals. The oscillator coil will resonant according to the high-frequency signals on these electro-magnet terminals. The oscillator coil are triggered to vibrate along one axis (e.g., horizontal) at one resonance frequency and to vibrate along another axis (e.g., vertical) at another resonance frequency.

However, the multiple-axes vibration actuator 122a is not limited to vibrate along the side-to-side direction and the back-and-forth direction relative to the interface device 120 as shown in FIG. 2. In another embodiment, the multiple-axes vibration actuator 122a can be configured to vibrate along three different axes, such as a side-to-side axis, a back-and-forth axis and an up-and-down axis. In still another embodiment, the multiple-axes vibration actuator 122a can be configured to vibrate along different combinations of two or more different axes (e.g., side-to-side, back-and-forth, up-and-down, clockwise and/or counter-clockwise).

As shown in FIG. 2, the motion sensor 124 of the interface device 120 can be utilized to detect a spatial orientation ORI of the interface device 120. The motion sensor 124 can be implemented by an Inertial Measurement Unit (IMU). The Inertial Measurement Unit is able to sense accelerations and angular rates on the interface device 120 along multiple axes. However, the disclosure is not limited thereto. The motion sensor 124 can also be implemented by an accelerometer or a gyro sensor, or any equivalent orientation sensor.

The haptic feedback circuit 122 and the motion sensor 124 are both implemented in the interface device 120. The spatial relationship between the first axis AX1, the second axis AX2 and the spatial orientation ORI detected by the motion sensor 124 will be fixed. Therefore, if the spatial orientation ORI is acknowledged, the directions of the first axis AX1 and the second axis AX2 will also be acknowledged.

The control circuit 126 is coupled to the haptic feedback circuit 122, the motion sensor 124 and the communication circuit 128. The communication circuit 128 is configured to communicate with the processing device 140. The control circuit 126 is able to collect the spatial orientation ORI detected by the motion sensor 124 and transmit the spatial orientation ORI to the processing device 140 through the communication circuit 128. The control circuit 126 is able to trigger and control the vibrations of the haptic feedback circuit 122 along the first axis AX1 and the second axis AX2.

Figure 3B:
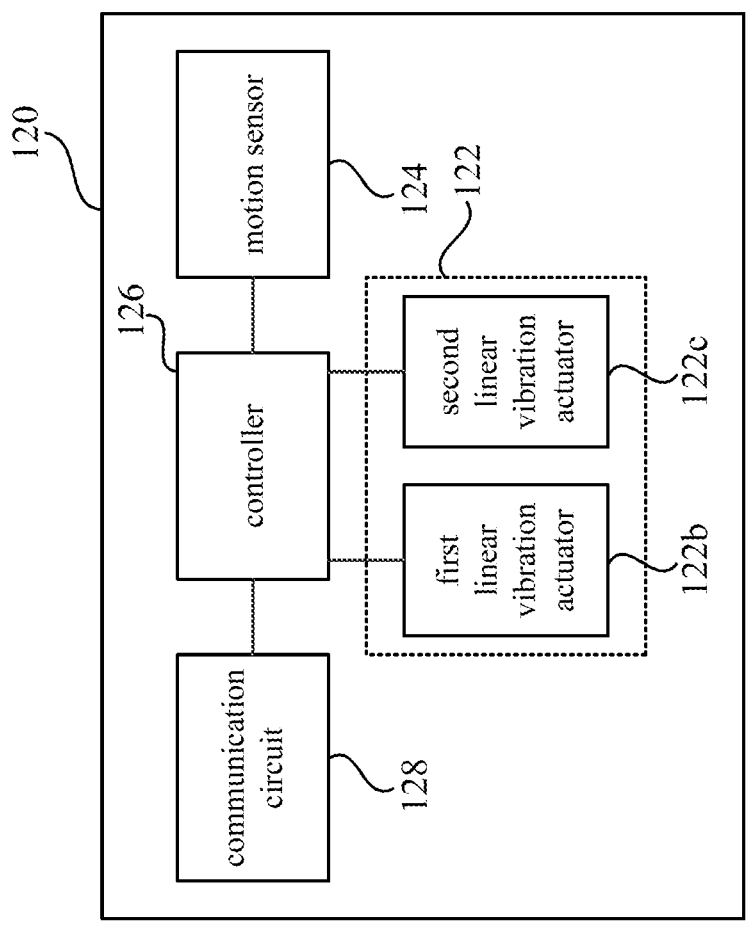
FIG. 3B is a functional block diagram illustrating the interface device according to another embodiment of the disclosure.

Furthermore, the haptic feedback circuit 122 in this disclosure is not limited to include the multiple-axes vibration actuator 122a as shown in FIG. 3A. Reference is further made to FIG. 3B. FIG. 3B is a functional block diagram illustrating the interface device 120 according to another embodiment of the disclosure. As shown in FIG. 3B, the interface device 120 includes the haptic feedback circuit 122, the motion sensor 124, the control circuit 126 and the communication circuit 128. It is noticed that, the haptic feedback circuit 122 shown in the embodiment of FIG. 3B includes a first linear vibration actuator 122b and a second linear vibration actuator 122c. The first linear vibration actuator 122b capable of vibrating along the first axis AX1 (referring to FIG. 2). The second linear vibration actuator 122c capable of vibrating along the second axis AX2 (referring to FIG. 2). Therefore, the first linear vibration actuator 122b and the second linear vibration actuator 122c are capable of driving the interface device 120 to vibrate individually along the first axis AX1 and along the second axis AX2.

In some other embodiments, the haptic feedback circuit 122 may include more than two linear vibration actuators (e.g., three linear vibration actuators along three different axes, or six linear vibration actuators along six different axes), such that the haptic feedback circuit 122 will be capable of inducing more realistic haptic feedback in various directions.

For brevity of demonstration, the haptic feedback circuit 122 in the following embodiments is capable of vibrating two axes (referring to the first axis AX1 and the second axis AX2 shown in FIG. 2). However, the haptic feedback circuit 122 is not limited thereto.

In some embodiments of this disclosure, the processing device 140 is configured to control the haptic feedback circuit 122 to induce the haptic feedback with different parameters (vibration amplitudes, vibration duration or vibration frequencies) along two axes AX1 and AX2 under different circumstances (e.g., different events occur in the immersive content IMC, or an event occurs to different objects in the immersive content IMC). Further details about how to determine the parameters of the haptic feedback under different circumstances will be discussed in following paragraphs.

Reference is further made to FIG. 4, which is a flow diagram illustrating a control method 400 according to some embodiments of the disclosure. The control method 400 is suitable to be applied on the immersive system 100 shown in FIG. 1 and aforesaid embodiments. As shown in FIG. 1, FIG. 2 and FIG. 4, in operation S410, the processor 142 of the processing device 140 provides the immersive content IMC to the electronic display 162 of the head mounted display device 160.

The immersive content IMC may include a scenario, a background, an avatar of the user, a first simulated object corresponding to the interface device 120 and/or some objects created by the immersive system 100 for virtual reality (VR), augmented reality (AR), substitutional reality (SR) or mixed reality (MR) experiences.

In the immersive content IMC, the first simulated object corresponding to the interface device 120 can be varied according to the scenario or the background in the VR/AR/SR/MR experiences. In an example, if the avatar of the user is a miner, the first simulated object of the interface device 120 can be transformed into a shovel. In another example, if the avatar of the user is a soldier, the first simulated object of the interface device 120 can be transformed into a pistol, a shotgun, a sniper rifle or an automatic rifle. In still example, if the avatar of the user is a baseball player or a tennis player, the first simulated object of the interface device 120 can be transformed into a bat or a tennis racket. In still example, if the avatar of the user is a race car driver, the first simulated object of the interface device 120 can be transformed into a steering wheel or a gear lever. In other words, the first simulated object corresponding to the interface device 120 can be transformed according to current data of the immersive content IMC.

In operation S430, the processor 142 of the processing device 140 identifies the first simulated object corresponding to the interface device 120 in the immersive content IMC.

The user may manipulate the interface device 120 with his/her hand. Based on user's manipulation, an interaction event may occur to the first simulated object in the immersive content IMC. In an example, the user may perform a movement to dig into the earth with the shovel (i.e., the first simulated object) in the immersive content IMC, and the interaction event is a digging action event. In another example, the user may pull a trigger on the pistol (i.e., the first simulated object) in the immersive content IMC, and the interaction event is a firing action event. In another example, the user may hit a virtual tennis ball with the tennis racket (i.e., the first simulated object) in the immersive content IMC, and the interaction event is a collision event between the virtual tennis ball and the tennis racket. In still another example, the user may shift the gear lever (i.e., the first simulated object) in the immersive content IMC, and the interaction event is a shifting action event on the gear lever.

In operation S450, the processor 142 of the processing device 140 identifies the interaction event occurring to the first simulated object in the immersive content IMC.

In operation S470, the processor 142 of the processing device 140 determines a vibration pattern according to the interaction event and the first simulated object. The vibration pattern determined by the processing device 140 includes a first vibration component along the first axis AX1 and a second vibration component along the second axis AX2. The first vibration component along the first axis AX1 may include a first vibration amplitude, a first vibration frequency or a first vibration duration. The second vibration component along the second axis AX2 may include a second vibration amplitude, a second vibration frequency or a second vibration duration. The vibration pattern will decide how strong (e.g., the first vibration amplitude and the second vibration amplitude), how long (e.g., the first vibration duration and the second vibration duration) and/or how intensive (e.g., the first vibration frequency and the second vibration frequency) the vibrations will be along the first axis AX1 and along the second axis AX2.

In some embodiments, the processing device 140 is configured to determine the vibration pattern based on the interaction event in the immersive content IMC. If the interaction event is a strong action (e.g., shooting, hitting a homerun), the vibration amplitudes will be larger. If the interaction event is a weak action, the vibration amplitudes will be smaller. If the interaction event is a long persistent event (e.g., holding an object in hands), the vibration durations will be longer. If the interaction event is a short transient event (e.g., an exploration), the vibration durations will be shorter.

In some embodiments, the processing device 140 is further configured to determine a parameter of the first simulated object in the immersive content IMC. The parameter includes a type, a weight, a hardness, a resilience or a material of the first simulated object in the immersive content IMC. The vibration pattern is determined according to the parameter of the first simulated object. If the weight of the first simulated object is heavy, the vibration amplitudes will be smaller or the vibration durations will be shorter. If the weight of the first simulated object is light, the amplitudes will be larger or the vibration durations will be longer. If the first simulated object has a great resilience, the amplitudes will be larger or the vibration durations will be longer. If the first simulated object is hard and has no resilience, the amplitudes will be smaller or the vibration durations will be shorter.

In operation S490, the processor 142 of the processing device 140 will send the vibration pattern determined in operation S470 to the haptic feedback circuit 122 on the interface device 120, so as to induce the haptic feedback on the interface device 120 according to the vibration pattern.

In other words, the processing device 140 will decide a suitable vibration pattern in operation S470 in response to that the interaction event occurs to the first simulated object, based on parameters of the first simulated object and characteristics of the interaction event identified in operations S430 and S450. Afterward, the haptic feedback circuit 122 on the interface device 120 will generate the haptic feedback according to the vibration pattern, such that the user can feel the suitable haptic feedback corresponding to the parameters of the first simulated object and the characteristics of the interaction event.

Figure 5:
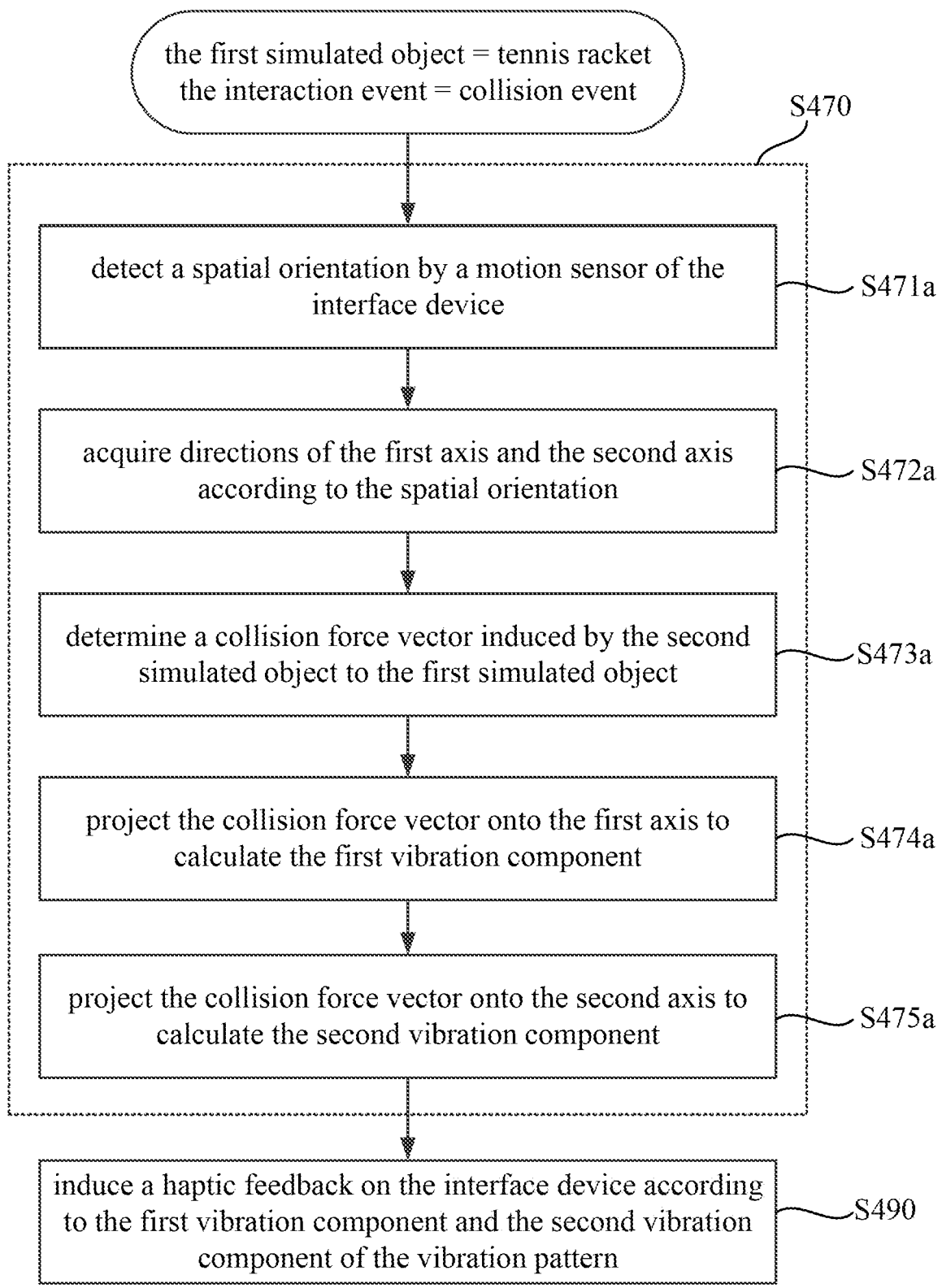
FIG. 5 is a flow diagram illustrating detail operations of one operation shown in FIG. 4 according to a demonstrational case of the disclosure.
Figure 6A:
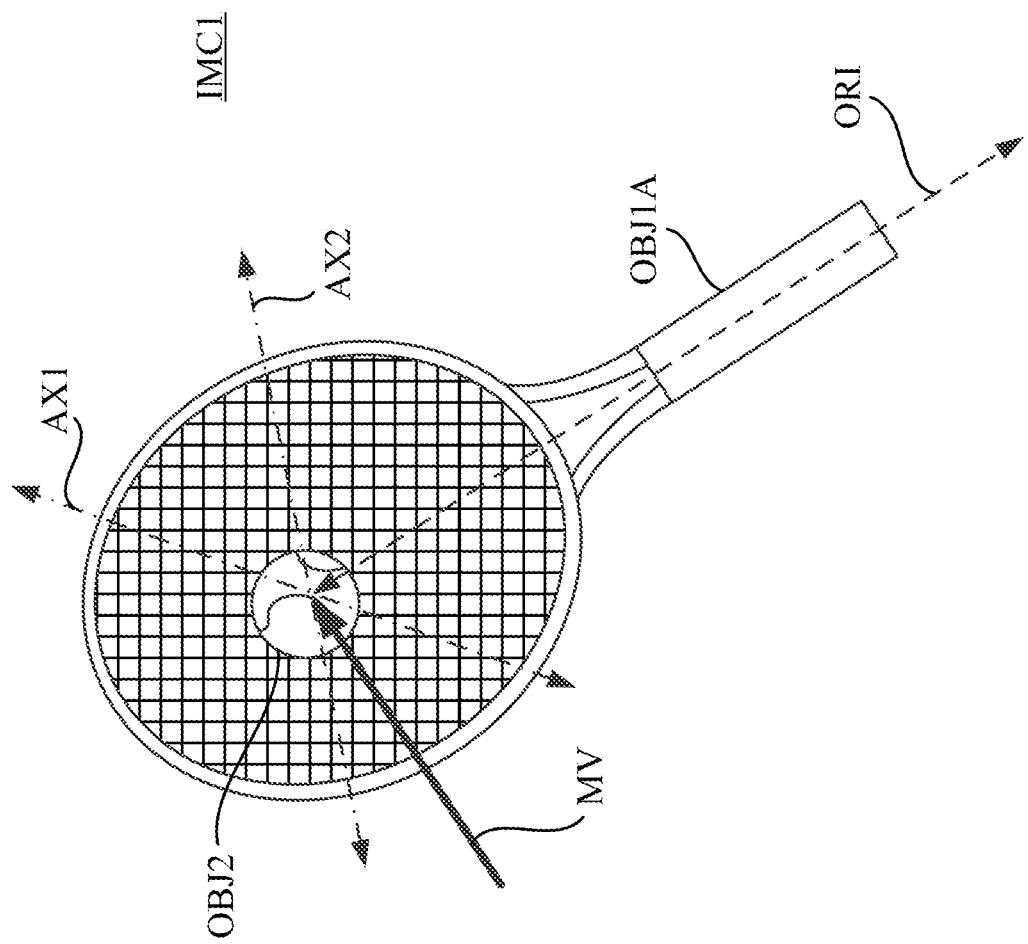
FIG. 6A is a schematic diagram illustrating an immersive content in the demonstrational case related to FIG. 5.
Figure 6B:
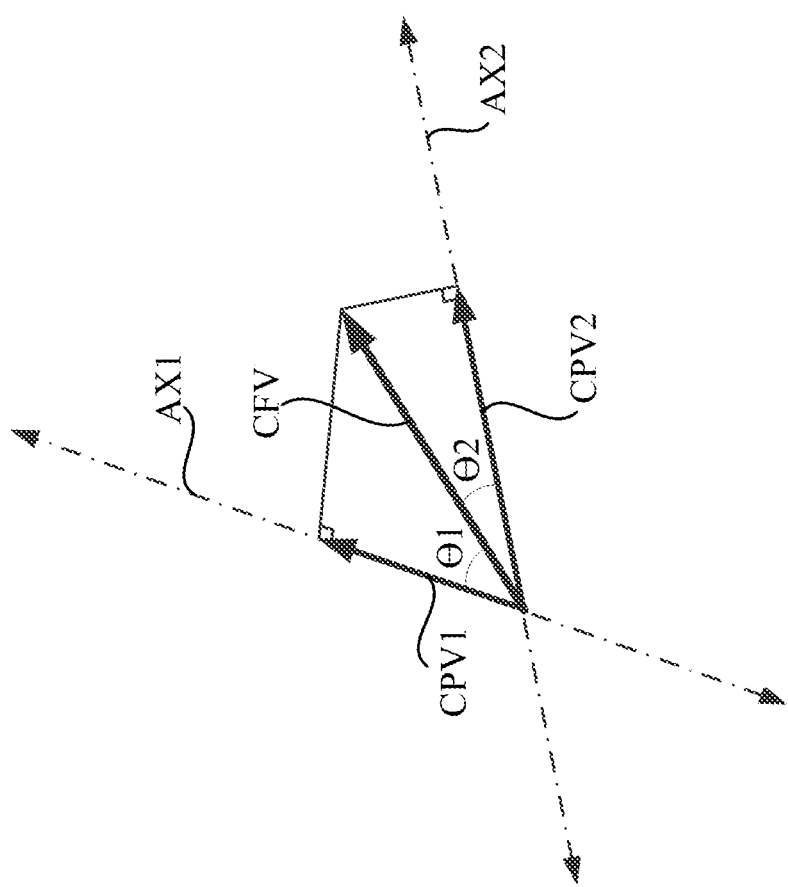
FIG. 6B is a schematic diagram illustrating a relationship of a collision force vector, a first vibration component and a second vibration component in the demonstrational case related to FIG. 5.

Reference is further made to FIG. 5, FIG. 6A and FIG. 6B. FIG. 5 is a flow diagram illustrating detail operations S471a-S475a of the operation S470 shown in FIG. 4 according to a demonstrational case of the disclosure. FIG. 6A is a schematic diagram illustrating an immersive content IMC1 in the demonstrational case related to FIG. 5. FIG. 6B is a schematic diagram illustrating a relationship of a collision force vector CFV, a first vibration component CPV1 and a second vibration component CPV2 in the demonstrational case related to FIG. 5.

In the demonstrational case of the immersive content IMC1 shown in FIG. 6A, the first simulated object OBJ1a is identified to be a tennis racket and the interaction event is identified to be a collision event between the first simulated object OBJ1a and a second simulated object OBJ2 (e.g., a tennis ball). In the collision event, the first simulated object OBJ1a collides with the second simulated object OBJ2 in the immersive content IMC1. For example, when the user hit the tennis ball with the tennis racket, the immersive system 100 want to provide a realistic haptic feedback on the interface device 120, such that the user can feel the collision event between the tennis ball and the tennis racket.

As shown in FIG. 1, FIG. 2, FIG. 5, FIG. 6A, in operation S471a, the motion sensor 124 of the interface device 120 is triggered to detect the spatial orientation ORI of the interface device 120, and the processing device 140 acquires the spatial orientation ORI from the interface device 120. Because the haptic feedback circuit 122 and the motion sensor 124 are both implemented in the interface device 120, the spatial relationship between the first axis AX1, the second axis AX2 and the spatial orientation ORI will be fixed. In operation S472a, the processing device acquires directions of the first axis AX1 and the second axis AX2 according to the spatial orientation ORI detected by the motion sensor 124.

As shown in FIG. 1, FIG. 2, FIG. 5 and FIG. 6B, in operation S473a, the processing device 140 determine a collision force vector CFV induced by the second simulated object OBJ2 to the first simulated object OBJ1a. In this demonstrational case shown in FIG. 6A and FIG. 6B, the collision force vector CFV is decided according to an original momentum vector MV of the second simulated object OBJ2 (e.g., the tennis ball) before the collision event. If the original momentum vector MV is larger (e.g., the mass of the tennis is larger or the velocity of the tennis is faster), the collision force vector CFV will be larger. If the original momentum vector MV is smaller (e.g., the mass of the tennis is lighter or the velocity of the tennis is slower), the collision force vector CFV will be smaller. In this demonstrational case, a direction of the collision force vector CFV can be aligned with a direction the original momentum vector MV of the second simulated object OBJ2.

As shown FIG. 1, FIG. 2, FIG. 5 and FIG. 6B, in operation S474a, the processing device 140 projects the collision force vector CFV onto the first axis AX1 to calculate the first vibration component CPV1. A length of the first vibration component CPV1 can be decided by a product between a length of the collision force vector CFV and an angle θ1, which can be represented as:

$$L(CPV1)=L(CFV)*\cos\theta 1$$

L(CPV1) is the length of first vibration component CPV1; L(CFV) is the length of collision force vector CFV; and, θ1 is an angle between the collision force vector CFV and the first axis AX1.

As shown FIG. 1, FIG. 2, FIG. 5 and FIG. 6B, in operation S475a, the processing device 140 projects the collision force vector CFV onto the second axis AX2 to calculate the second vibration component CPV2. A length of the second vibration component CPV2 can be decided by a product between a length of the collision force vector CFV and another angle θ2, which can be represented as:

$$L(CPV2)=L(CFV)*\cos\theta 2$$

L(CPV2) is the length of second vibration component CPV2; L(CFV) is the length of collision force vector CFV; and, θ2 is an angle between the collision force vector CFV and the second axis AX2.

In this demonstrational case, the vibration pattern determined by operation S470 include the first vibration component CPV1 along the first axis AX1 as shown in FIG. 6B and also the second vibration component CPV2 along the second axis AX2 as shown in FIG. 6B.

In operation S490, the haptic feedback circuit 122 is configured to induce the vibration feedback with the first vibration component CPV1 along the first axis AX1 and the second vibration component CPV2 along the second axis AX2 at the same time.

In this demonstrational case, the length of the second vibration component CPV2 is longer than the length of the first vibration component CPV1. It means the haptic feedback circuit 122 will be induce a larger degree of vibration along the second axis AX2, and a smaller degree of vibration along the first axis AX1.

In some embodiments, a relationship between the vibration along the first axis AX1 and the vibration along the second axis AX2 can be determined according the ratio between the length of the first vibration component CPV1 and the length of the second vibration component CPV2.

Figure 7A:
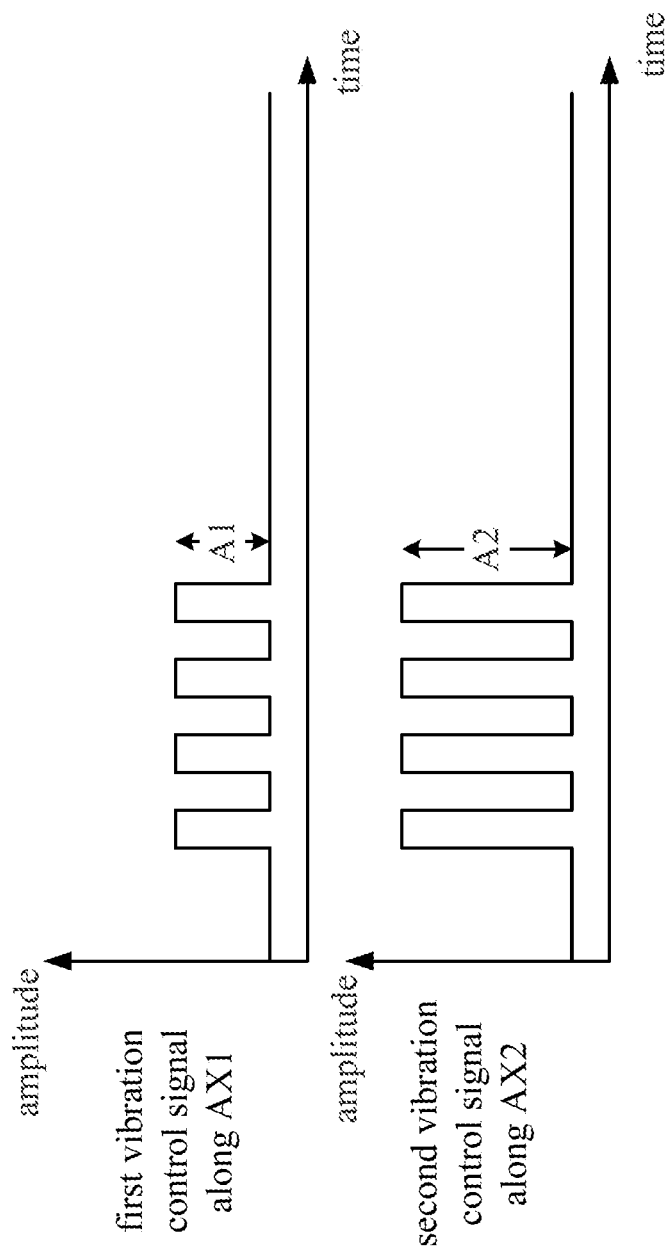
FIG. 7A is a signal waveform diagram illustrating a first vibration control signal along the first axis and a second vibration control signal along the second axis according to an embodiment of the disclosure.

Reference is further made to FIG. 7A, which is a signal waveform diagram illustrating a first vibration control signal along the first axis AX1 and a second vibration control signal along the second axis AX2 according to an embodiment of the disclosure.

In one embodiment, the first vibration control signal and the second vibration control signal are provided to the multiple-axes vibration actuator 122a shown in FIG. 3A to control the vibration along the first axis AX1 and the vibration along the second axis AX2 respectively. In another embodiment, the first vibration control signal is provided to the first linear vibration actuator 122b shown in FIG. 3B to control the vibration along the first axis AX1, and the second vibration control signal is provided to the second linear vibration actuator 122c shown in FIG. 3B to control the vibration along the second axis AX2. The first vibration control signal and the second vibration control signal are decided by the length of the first vibration component CPV1 and the length of the second vibration component CPV2.

In the embodiment shown in FIG. 7A, the amplitude A2 of the second vibration control signal is twice as high as the amplitude A1 of the first vibration control signal. In this case, the strength of the vibration along the second axis AX2 induced by the haptic feedback circuit 122 will be twice as strong as the strength of the vibration along the first axis AX1. In this case, the user can feel a combined vibration which is a combination of the vibration along the first axis AX1 and the vibration along the second axis AX2. The combined vibration can simulate the vibration induced by the collision force induced by the tennis ball to the tennis racket. The combined vibration can simulate an impact from different inward directions (not limited to the first axis AX1 itself or the second axis AX2 itself), such that the user can feel the impact of the collision force from different inward directions on the interface device 120.

In some other embodiments, if the interface device 120 is a vest worn on the torso of the user, the user can feel the collision force from different inward directions on his/her torso.

Figure 7B:
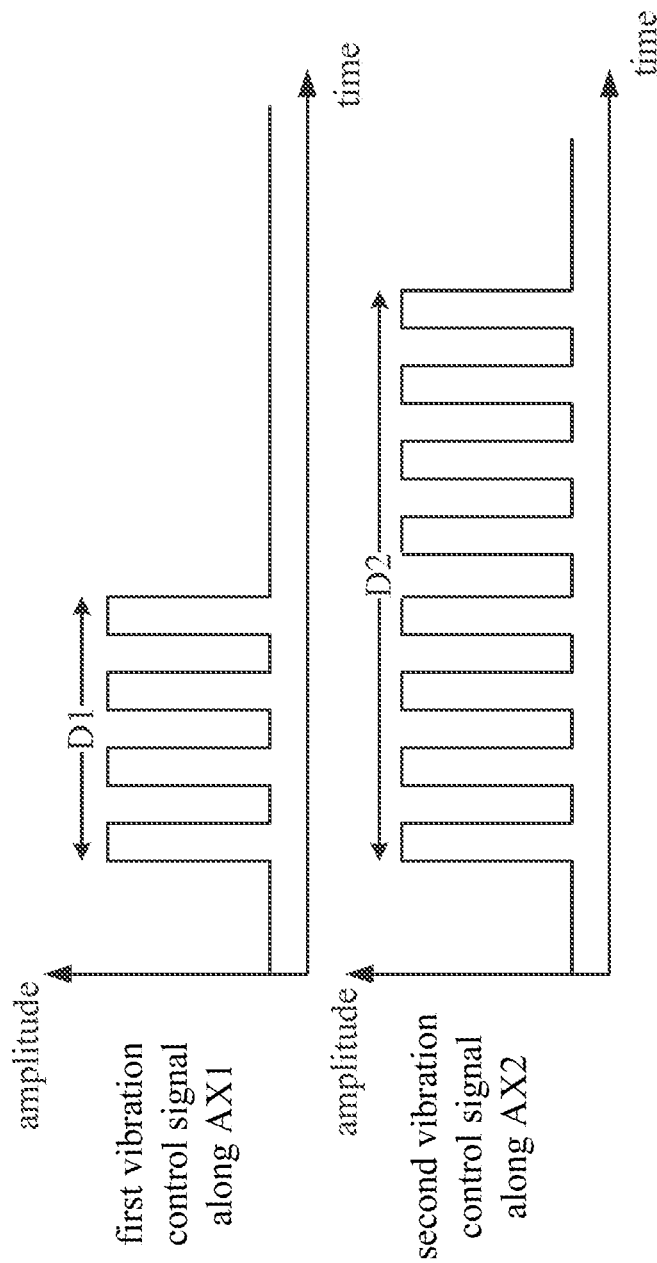
FIG. 7B is a signal waveform diagram illustrating a first vibration control signal along the first axis and a second vibration control signal along the second axis according to another embodiment of the disclosure.

Reference is further made to FIG. 7B, which is a signal waveform diagram illustrating a first vibration control signal along the first axis AX1 and a second vibration control signal along the second axis AX2 according to another embodiment of the disclosure.

In the embodiment shown in FIG. 7B, a duration D2 of the second vibration control signal is twice as long as a duration D1 of the first vibration control signal. In this case, a duration of the vibration along the second axis AX2 induced by the haptic feedback circuit 122 will be twice as long as a duration of the vibration along the first axis AX1. In this case, the vibrations induced by the haptic feedback circuit 122 along different axes AX1 and AX2 are different in persisting duration. The user can feel the combined vibration of the vibrations along two axes AX1 and AX2 as well.

Based on the embodiment shown in FIG. 7A, the first vibration component CPV1 along the first axis AX1 can induce a vibration with a first vibration amplitude A1 on the interface device 120, and the second vibration component CPV2 along the second axis AX2 can induce a vibration with a second vibration amplitude A2 different from the first vibration amplitude A1. Based on the embodiment shown in FIG. 7B, the first vibration component CPV1 along the first axis AX1 can induce a vibration with a first vibration duration D1, and the second vibration component CPV2 along the second axis AX2 can induce a vibration with a second vibration duration D2 different from the first vibration duration D1. In still another embodiment, the first vibration component CPV1 along the first axis AX1 can induce a vibration with a first vibration frequency (e.g., a low frequency at 5 Hz), and the second vibration component CPV2 along the second axis AX2 can induce a vibration with a second vibration frequency (e.g., a high frequency at 20 Hz) different from the first vibration frequency.

Figure 8:
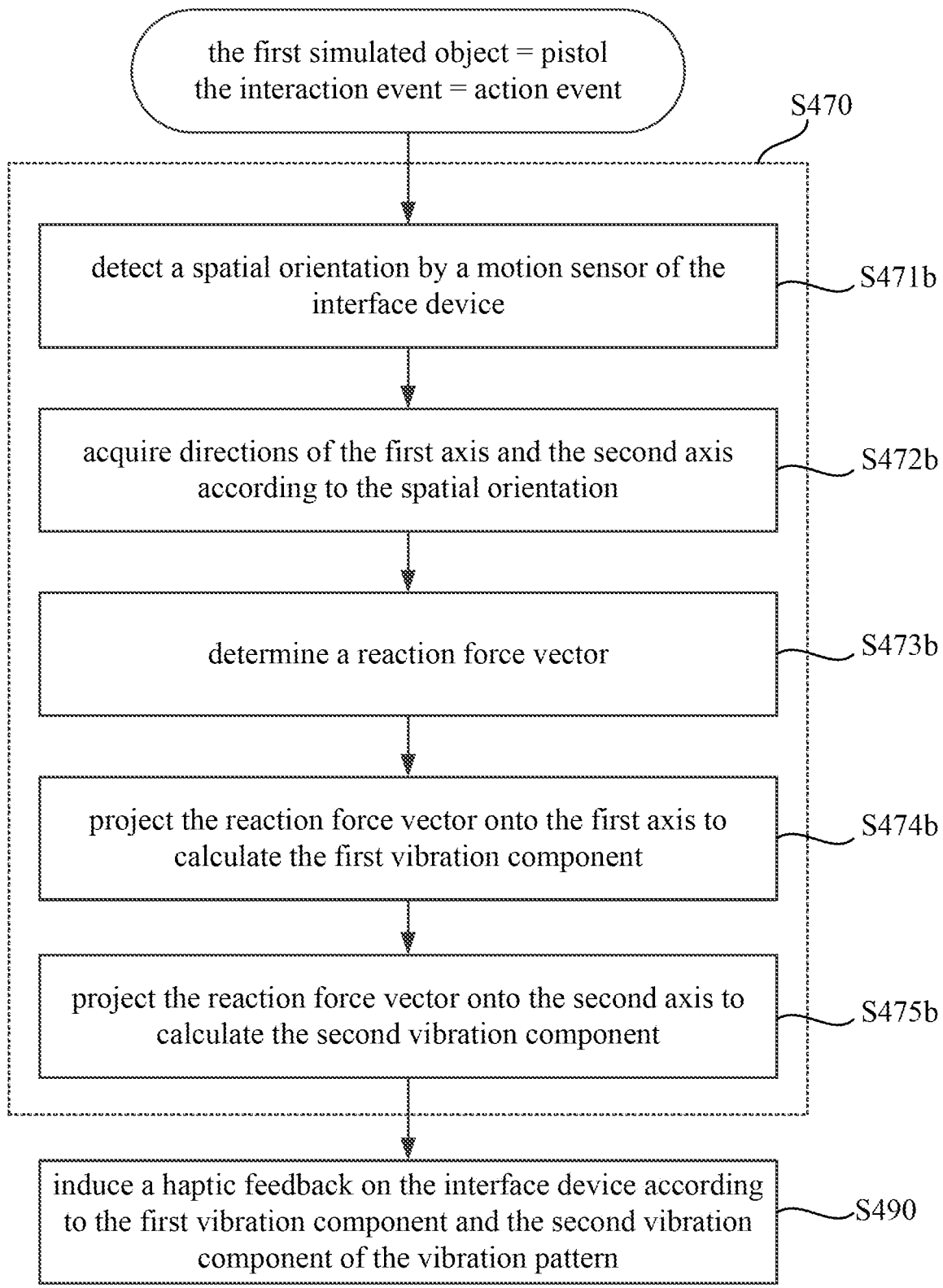
FIG. 8 is a flow diagram illustrating detail operations of the operation shown in FIG. 4 according to another demonstrational case of the disclosure.
Figure 9A:
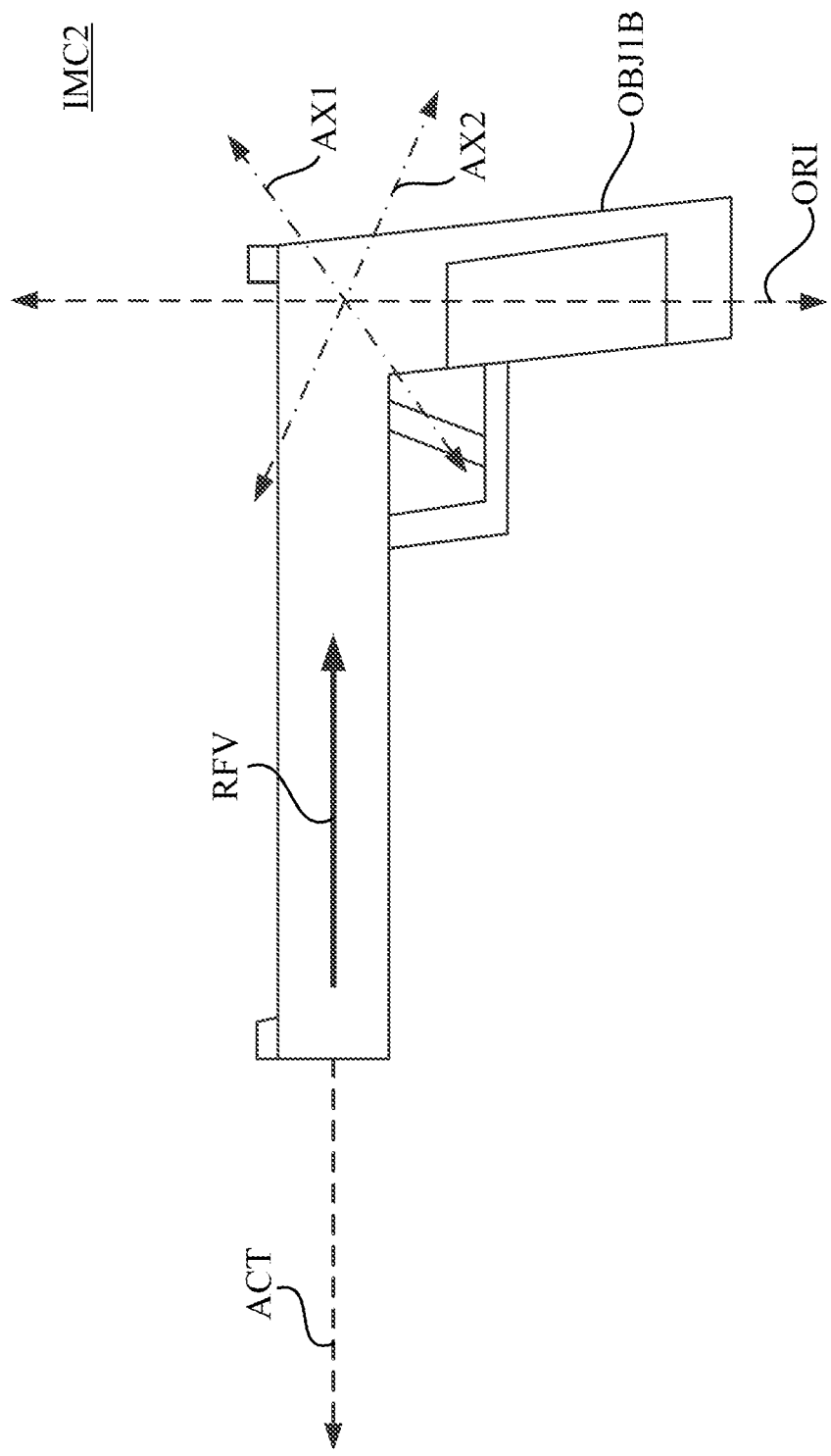
FIG. 9A is a schematic diagram illustrating an immersive content in the demonstrational case related to FIG. 8.
Figure 9B:
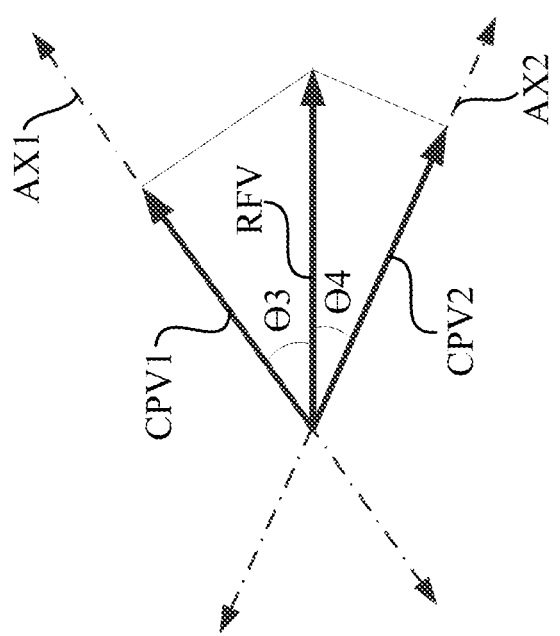
FIG. 9B is a schematic diagram illustrating a relationship of a reaction force vector, a first vibration component and a second vibration component in the demonstrational case related to FIG. 8.

Reference is further made to FIG. 8, FIG. 9A and FIG. 9B. FIG. 8 is a flow diagram illustrating detail operations S471b-S475b of the operation S470 shown in FIG. 4 according to another demonstrational case of the disclosure. FIG. 9A is a schematic diagram illustrating an immersive content IMC2 in the demonstrational case related to FIG. 8. FIG. 9B is a schematic diagram illustrating a relationship of a reaction force vector RFV, a first vibration component CPV1 and a second vibration component CPV2 in the demonstrational case related to FIG. 8.

In the demonstrational case of the immersive content IMC2 shown in FIG. 9A, the first simulated object OBJ1b is identified to be a pistol and the interaction event is identified to be an action event ACT related to the first simulated object OBJ1b. For example, when the user experiences a shooting game in the immersive content IMC2, the user can press (or pull) a switch button on the interface device 120 shown in FIG. 1, and a corresponding action event ACT will occur to the first simulated object OBJ1b based on user's manipulation. In this demonstrational case, the action event ACT is firing along a first direction (e.g., toward the front of the pistol). When the user pull the trigger on the pistol in the immersive content IMC2, the immersive system 100 want to provide a realistic haptic feedback on the interface device 120, such that the user can feel the action event on the pistol.

As shown in FIG. 1, FIG. 2, FIG. 8, FIG. 9A, in operation S471b, the motion sensor 124 of the interface device 120 is triggered to detect the spatial orientation ORI of the interface device 120, and the processing device 140 acquires the spatial orientation ORI from the interface device 120. The spatial relationship between the first axis AX1, the second axis AX2 and the spatial orientation ORI are fixed. In operation S472b, the processing device acquires directions of the first axis AX1 and the second axis AX2 according to the spatial orientation ORI detected by the motion sensor 124.

As shown in FIG. 1, FIG. 2, FIG. 8, FIG. 9A and FIG. 9B, in operation S473b, the processing device 140 determine a reaction force vector RFV induced by the action event ACT occurring on the first simulated object OBJ1b. In this demonstrational case shown in FIG. 9A and FIG. 9B, the reaction force vector RFV is along a second direction (to the backward of the pistol) opposite to the shooting direction in the action event ACT. The reaction force vector RFV is also determined by an action force created by the action event ACT. The reaction force vector RFV will be larger when the action force is larger (e.g., the first simulated object OBJ1b transforms into a shotgun). If the action force created by the action event ACT is smaller, the reaction force vector RFV will be smaller. In this demonstrational case, a direction of the reaction force vector RFV can be opposite to a direction of the action event ACT occurring to the first simulated object OBJ1b as shown in FIG. 9A.

As shown FIG. 1, FIG. 2, FIG. 8 and FIG. 9B, in operation S474b, the processing device 140 projects the reaction force vector RFV onto the first axis AX1 to calculate the first vibration component CPV1. A length of the first vibration component CPV1 can be decided by a product between a length of the reaction force vector RFV and an angle θ3, which can be represented as:

$$L(CPV1)=L(RFV)*\cos θ3$$

L(CPV1) is the length of first vibration component CPV1; L(RFV) is the length of reaction force vector RFV; and, θ3 is an angle between the reaction force vector RFV and the first axis AX1.

As shown FIG. 1, FIG. 2, FIG. 8 and FIG. 9B, in operation S475b, the processing device 140 projects the reaction force vector RFV onto the second axis AX2 to calculate the second vibration component CPV2. A length of the second vibration component CPV2 can be decided by a product between a length of the reaction force vector RFV and another angle θ4, which can be represented as:

$$L(CPV2)=L(RFV)*\cos θ4$$

L(CPV2) is the length of second vibration component CPV2; L(CFV) is the length of reaction force vector RFV; and, θ4 is an angle between the reaction force vector RFV and the second axis AX2.

In this demonstrational case, the vibration pattern determined by operation S470 include the first vibration component CPV1 along the first axis AX1 as shown in FIG. 9B and also the second vibration component CPV2 along the second axis AX2 as shown in FIG. 9B.

In operation S490, the haptic feedback circuit 122 is configured to induce the vibration feedback with the first vibration component CPV1 along the first axis AX1 and the second vibration component CPV2 along the second axis AX2 at the same time.

In an embodiment, the first vibration component CPV1 along the first axis AX1 can induce a vibration with a first vibration amplitude on the interface device 120, and the second vibration component CPV2 along the second axis AX2 can induce a vibration with a second vibration amplitude different from the first vibration amplitude (referring to FIG. 7A). In another embodiment, the first vibration component CPV1 along the first axis AX1 can induce a vibration with a first vibration duration, and the second vibration component CPV2 along the second axis AX2 can induce a vibration with a second vibration duration D2 different from the first vibration duration D1. In still another embodiment, the first vibration component CPV1 along the first axis AX1 can induce a vibration with a first vibration frequency (e.g., a low frequency at 5 Hz), and the second vibration component CPV2 along the second axis AX2 can induce a vibration with a second vibration frequency (e.g., a high frequency at 20 Hz) different from the first vibration frequency.

Based on aforesaid embodiments, the processing device 140 will decide a suitable vibration pattern in operation S470 in response to that the interaction event occurs to the first simulated object, based on parameters of the first simulated object and characteristics of the interaction event identified in operations S430 and S450. The haptic feedback circuit 122 on the interface device 120 will generate the haptic feedback along two or more directional axes according to the vibration pattern. The vibrations along different axes can be configured to have individual amplitudes, durations and/or frequencies. The user can feel the suitable haptic feedback corresponding to the parameters of the first simulated object and the characteristics of the interaction event.

In an embodiment, the processing device 140 of the immersive system 100 may run a host program to control basic operations (e.g., signal transmission, power management and/or basic user interface) of the interface device 120 and the head mounted display (HMD) device 160. The processing device 140 may further run an application program for providing the immersive content IMC. The application program can be an immersive gaming application, an immersive interaction video player application or any equivalent executed on the immersive system 100. In an embodiment, the application program can be developed by a provider, which is different from a manufacturer of the immersive system 100. In another embodiment, the application program can also be developed by the manufacturer of the immersive system 100.

Figure 10:
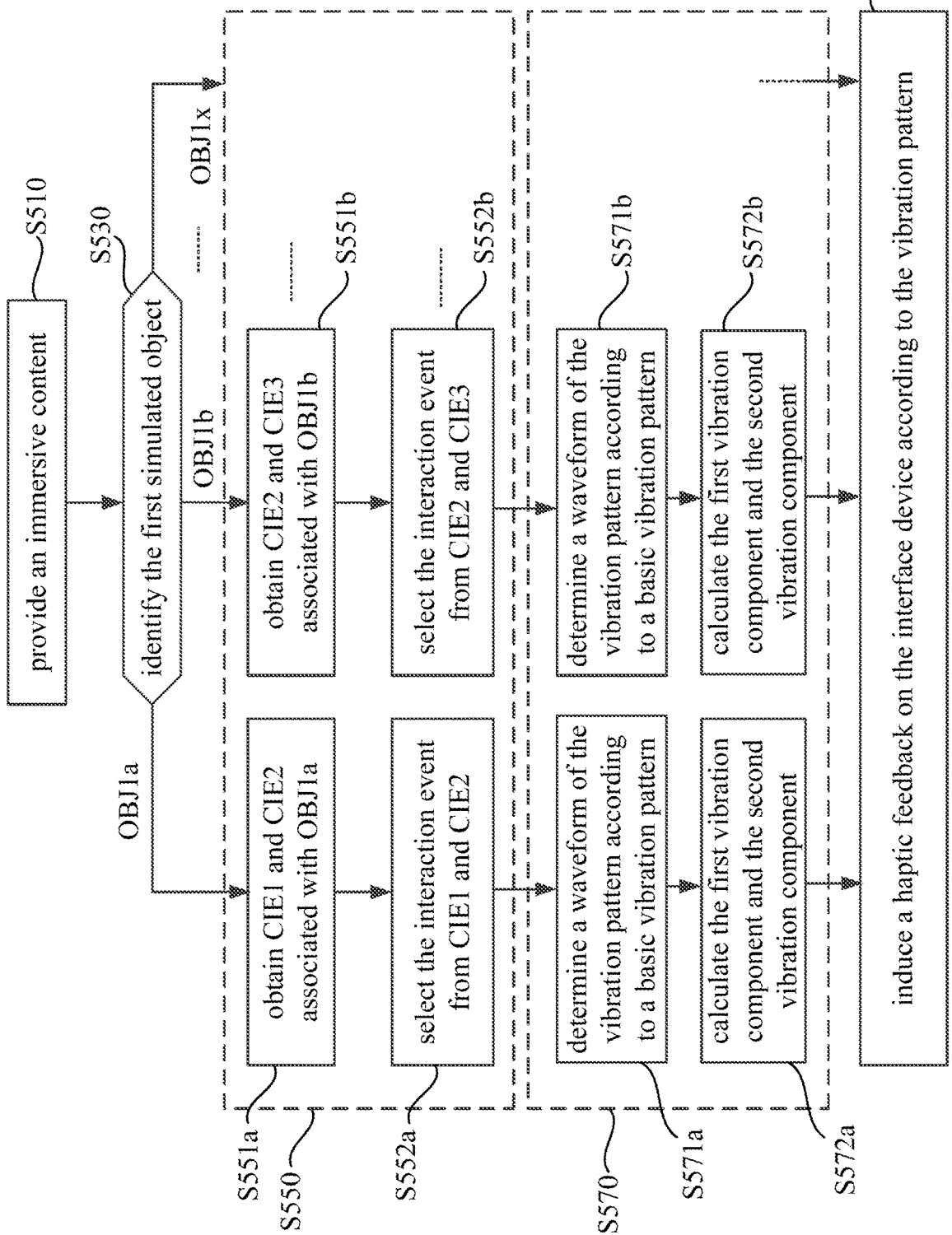
FIG. 10 is a flow diagram illustrating a control method according to some embodiments of the disclosure

In an embodiment, the application program is configured to provide some different basic vibration patterns corresponding to different interaction events to the host program. Reference is further made to FIG. 10, which is a flow diagram illustrating a control method 500 according to some embodiments of the disclosure. As shown in FIG. 1 and FIG. 10, in operation S510, the processor 142 of the processing device 140 provides the immersive content IMC to the electronic display 162 of the head mounted display device 160. The immersive content IMC can be varied according to the application program currently executed on the immersive system 100. When the application program is a sport game for playing tennis, the immersive content IMC1 in FIG. 6A can be displayed on the electronic display 162. When the application program is a shooting game, the immersive content IMC2 in FIG. 9A can be displayed on the electronic display 162.

As shown in FIG. 1 and FIG. 10, in operation S530 is performed to identify the first simulated object corresponding to the interface device 120 in the current-displaying immersive content IMC. The first simulated object can be different according to the immersive content IMC associated with the application program currently executed on the immersive system 100. In the embodiment shown in FIG. 6A, the processing device 140 will identify the first simulated object OBJ1a as a tennis racket. In the embodiment shown in FIG. 9A, the processing device 140 will identify the first simulated object OBJ1b as a pistol.

In this embodiment, the application program executed on the immersive system 100 may provide some candidate interaction events associated with the first simulated object.

For example, when the first simulated object OBJ1*a* is identified in the immersive content IMC1, there are two candidate interaction events CIE1 and CIE2 associated with the first simulated object OBJ1*a*. One candidate interaction event CIE1 can be a collision event between the tennis racket and a tennis ball. Another candidate interaction event CIE2 can be a friction event of dragging the tennis racket on the ground. In this embodiment, the application program also provides different basic vibration patterns associated with these two candidate interaction events.

Figure 11A:
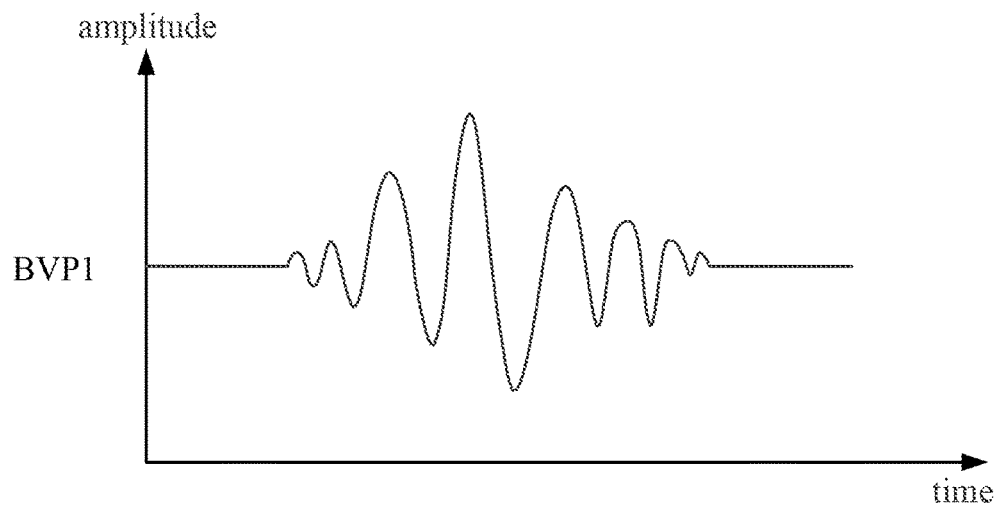
FIG. 11A is a waveform diagram illustrating a basic vibration pattern associated with one candidate interaction event.
Figure 11B:
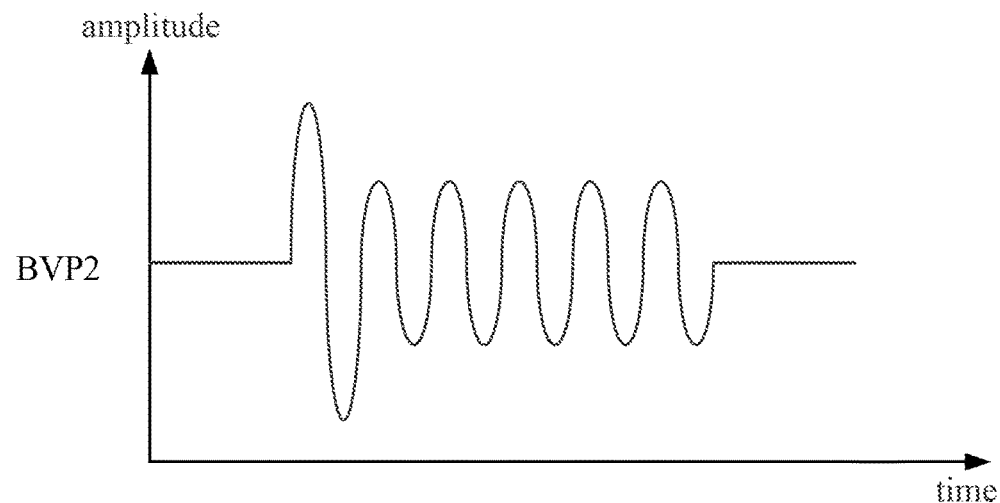
FIG. 11B is another waveform diagram illustrating another basic vibration pattern associated with another candidate interaction event.

Reference is further made to FIG. 11A and FIG. 11B. FIG. 11A is a waveform diagram illustrating a basic vibration pattern BVP1 associated with the candidate interaction event CIE1 (e.g., the collision event between the tennis racket and a tennis ball). FIG. 11B is another waveform diagram illustrating another basic vibration pattern BVP2 associated with the candidate interaction event CIE2 (e.g., the friction event of dragging the tennis racket on the ground).

In this case, the basic vibration pattern BVP1 for the collision event is different from the basic vibration pattern BVP2 for the friction event. For the collision event, the strength of vibration is gradually increased at first and the gradually decreased as shown in the basic vibration pattern BVP1. The basic vibration pattern BVP1 can be designed to be varied to simulate resilience between the tennis racket and the tennis ball. For the friction event, the strength of vibration gets higher at the beginning and remains steady during the rest of the friction event. The basic vibration pattern BVP2 can be designed to simulate a friction force between the tennis racket and the ground. The basic vibration pattern BVP1 and the basic vibration pattern BVP2 are designed to be different in order to simulate the characteristics of the candidate interaction events. In this embodiment, the application program is configured to provide the basic vibration patterns BVP1 and BVP2 associated with these two candidate interaction events CIE1 and CIE2 to the host program of the immersive system 100.

For example, when the first simulated object OBJ1*b* is identified in the immersive content IMC2, there are two candidate interaction events CIE2 and CIE3 associated with the first simulated object OBJ1*b*. One candidate interaction event CIE2 can be a friction event between the pistol and a wall surface. Another candidate interaction event CIE3 can be a firing event of the pistol. In this embodiment, the application program also provides different basic vibration patterns associated with these two candidate interaction events.

Figure 11C:
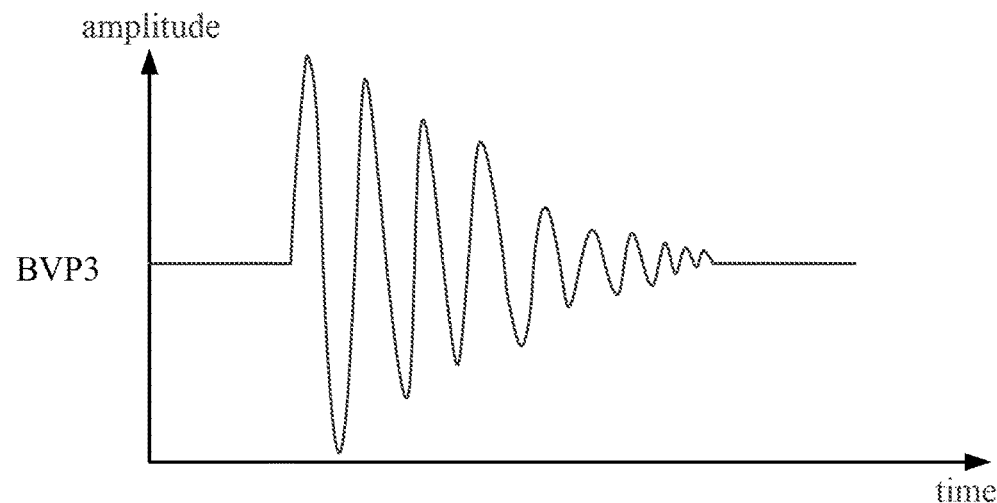
FIG. 11C is another waveform diagram illustrating another basic vibration pattern associated with another candidate interaction event.

Reference is further made to FIG. 11B and FIG. 11C. FIG. 11B illustrates the basic vibration pattern BVP2 associated with the candidate interaction event CIE2 (e.g., the friction event between the pistol and the wall surface). FIG. 11C is another waveform diagram illustrating another basic vibration pattern BVP3 associated with the candidate interaction event CIE3 (e.g., the firing event of the pistol).

In this embodiment, the friction event between the pistol and the wall surface can be regarded to be the same type as the friction event of dragging the tennis racket on the ground.

In another embodiment, the friction event between the pistol and the wall surface can be regarded to be different from the friction event of dragging the tennis racket on the ground, and the application program should provide different basic vibration patterns respectively for two different friction events (not shown in figures).

In this case, the basic vibration pattern BVP3 for the firing event is different from the basic vibration patterns BVP1 and BVP2. For the firing event, the strength of vibration is increased dramatically at first and the gradually decreased as shown in the basic vibration pattern BVP3. The basic vibration pattern BVP3 can be designed to be varied to simulate a burst power when the user pulls the trigger of the pistol. In this embodiment, the application program is configured to provide the basic vibration patterns BVP2 and BVP3 associated with these two candidate interaction events CIE2 and CIE3 to the host program of the immersive system 100.

After the first simulated object corresponding to the interface device is identified, the operation S550 is executed by the processor 142 to identify the interaction event occurring to the first simulated object in the immersive content IMC. In the embodiment shown in FIG. 10, the operation S550 is performed according to the first simulated object identified in the operation S530.

If the first simulated object OBJ1*a* is identified in S530, the operation S550 includes operations S551*a* and S552*a*. Operation S551*a* is executed to obtain the two candidate interaction events CIE1 and CIE2 associated with the first simulated object OBJ1*a*, and operation S552*a* is executed to select one from the candidate interaction events CIE1 and CIE2 to be the interaction event occurring to the first simulated object OBJ1*a* in the immersive content.

Afterward, the operation S570 is executed to determine a vibration pattern according to the interaction event and the first simulated object OBJ1*a*. If the first simulated object OBJ1*a* is identified in S530, operation S570 includes operations S571*a* and S572*a*. In operation S571*a*, the processing device 140 determines a waveform of the vibration pattern according to one of the basic vibration patterns BVP1/BVP2 associated with the selected one of the candidate interaction events CIE1/CIE2.

If the candidate interaction event CIE1 is selected to the interaction event occurring to the first simulated object OBJ1*a*, the waveform of the vibration pattern will be decided according to the basic vibration patterns BVP1. In operation S572*a*, the processing device 140 calculate the first vibration component of the vibration pattern along the first axis and the second component of the vibration pattern along the second axis. Details about how to calculate the first vibration component of the vibration pattern along the first axis and the second component of the vibration pattern along the second axis are already discussed in aforesaid embodiments. For the candidate interaction event CIE1 (the collision event between the tennis racket and the tennis ball), the calculation are discussion in operations S471*a*-S475*a* in FIG. 5, FIG. 6A and FIG. 6B. Afterward, operation S590 is executed to control the haptic feedback circuit to induce the haptic feedback according to the vibration pattern.

Figure 12:
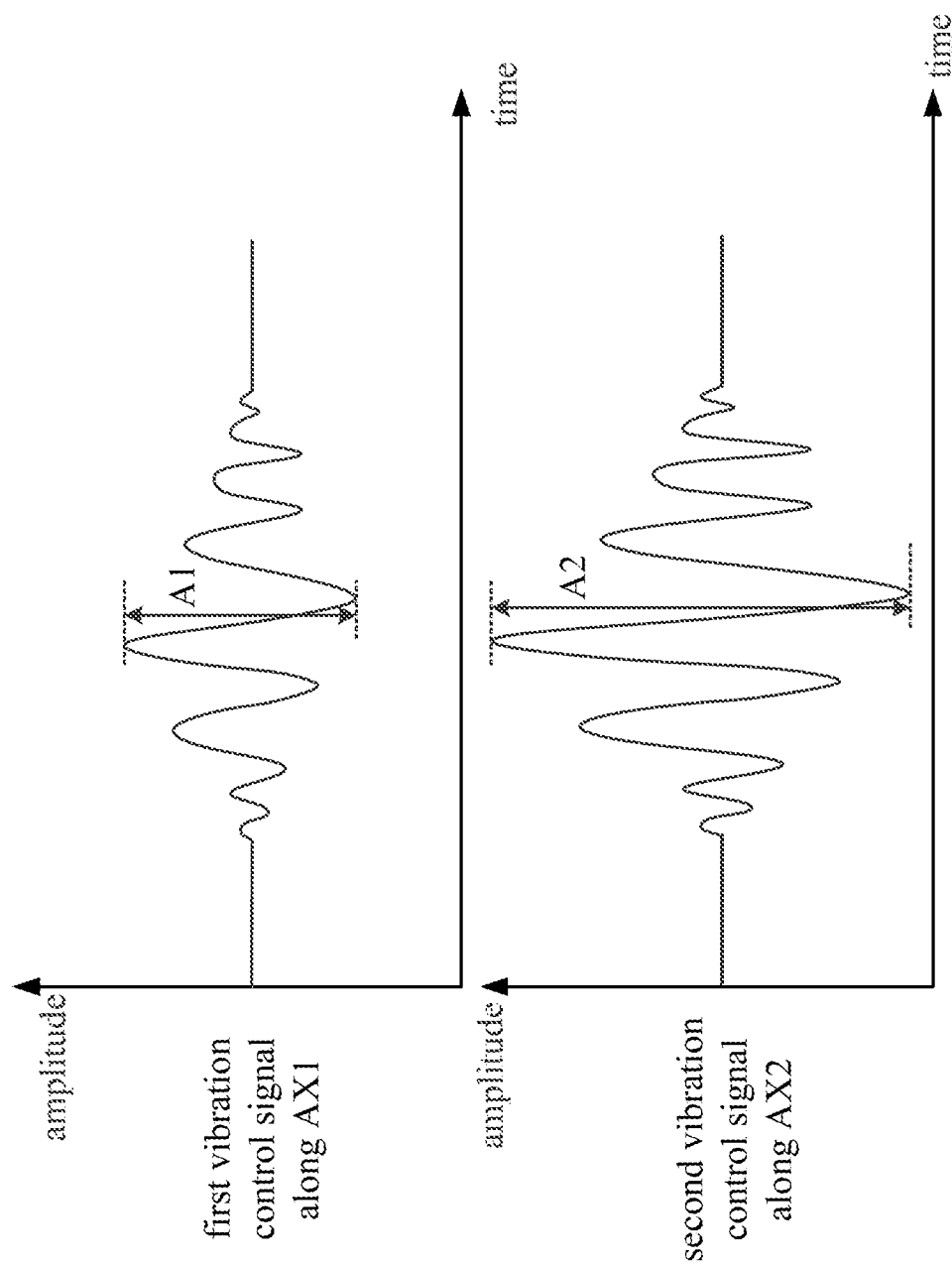
FIG. 12 is a signal waveform diagram illustrating a first vibration control signal along the first axis and a second vibration control signal along the second axis according to an embodiment of the disclosure.

Reference is further made to FIG. 12, which is a signal waveform diagram illustrating a first vibration control signal along the first axis AX1 and a second vibration control signal along the second axis AX2 according to an embodiment of the disclosure when the first simulated object OBJ1*a* is identified, the candidate interaction events CIE1 is selected and the basic vibration pattern BVP1 is utilized to decide the waveform of the vibration pattern. As shown in FIG. 12, the first vibration control signal along the first axis AX1 has a waveform similar to the basic vibration pattern BVP1, and the second vibration control signal along the second axis AX2 has a waveform also similar to the basic vibration pattern BVP1. The first vibration control signal along the first axis AX1 and the second vibration control signal along the second axis AX2 can have different vibration amplitude A1 and A2 according to the first vibration component and the second vibration component calculated in the operation S572a.

Vibration amplitudes, vibration frequencies or vibration durations of the first vibration component and the second vibration component of the vibration pattern are determined by the application program or a host program executed on the processing device. The waveforms of the first vibration control signal along the first axis AX1 and the second vibration control signal along the second axis AX2 are decided by the basic vibration pattern BVP1 provided by the application problem.

Figure 13:
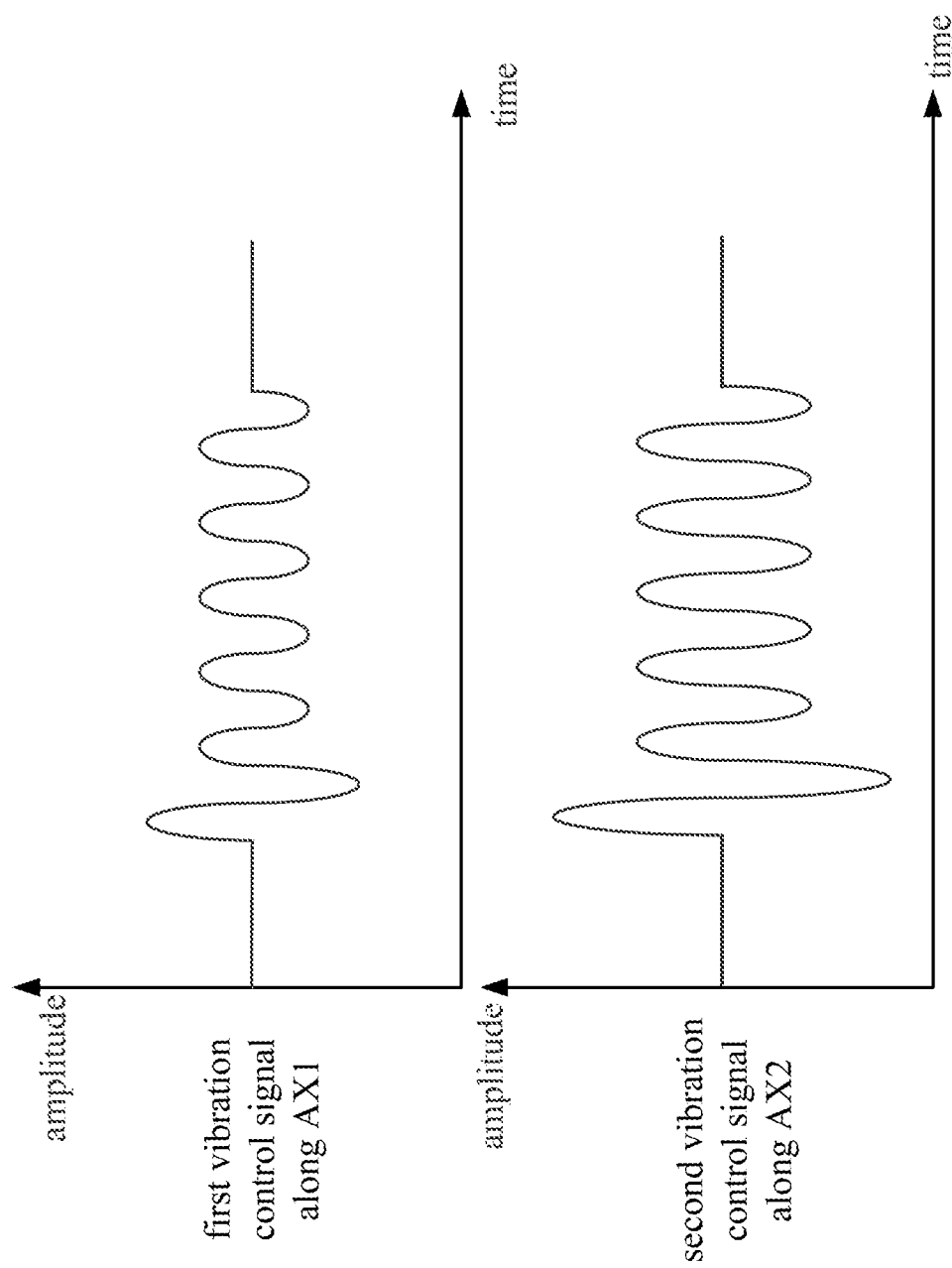
FIG. 13 is another signal waveform diagram illustrating a first vibration control signal along the first axis and a second vibration control signal along the second axis according to another embodiment of the disclosure.

After the first simulated object OBJ1a is identified, if the candidate interaction event CIE2 is selected in S552a, the basic vibration pattern BVP2 will be utilized to decide the waveform of the vibration pattern. In this case, reference is further made to FIG. 13, which is a signal waveform diagram illustrating a first vibration control signal along the first axis AX1 and a second vibration control signal along the second axis AX2 when the first simulated object OBJ1a is identified, the candidate interaction events CIE2 is selected and the basic vibration pattern BVP2 is utilized to decide the waveform of the vibration pattern.

On the other hand, if the first simulated object identified in operation S530 is the first simulated object OBJ1b shown in FIG. 9A, operation S551b will be executed to obtain two candidate interaction events CIE2 and CIE3 associated with the first simulated object OBJ1b. Operation S552b will be executed to select the interaction event from the candidate interaction events CIE2 and CIE3. Afterward, in operation S571b, the processing device 140 determines a waveform of the vibration pattern according to one of the basic vibration patterns BVP2/BVP3 associated with the selected one of the candidate interaction events CIE2/CIE3. In operation S572b, the processing device 140 calculate the first vibration component of the vibration pattern along the first axis and the second component of the vibration pattern along the second axis. Details about how to calculate the first vibration component of the vibration pattern along the first axis and the second component of the vibration pattern along the second axis are already discussed in aforesaid embodiments. For the candidate interaction event CIE3 (the action event of the pistol), the calculation are discussion in operations S471b-S475b in FIG. 8, FIG. 9A and FIG. 9B. Afterward, operation S590 is executed to control the haptic feedback circuit to induce the haptic feedback according to the vibration pattern. A waveform of the vibration pattern will be decided according to the basic vibration pattern BVP2 or the basic vibration pattern BVP3.

It is noticed that the control method 500 in FIG. 10 is not limited to only two different types of first simulated object OBJ1a and OBJ1b as shown in FIG. 6A and FIG. 9A. When there is another first simulated object OBJ1x identified in operation S530, the control method 500 will obtain some candidate interaction events associated with the first simulated object OBJ1x and perform the following operations S550-S590. Therefore, the control method 500 is not limited to the first simulated object OBJ1a and OBJ1b.

In this case, a developer of the application problem only needs to provide the basic vibration patterns BVP1-BVP3 for different interaction events CIE1-CIE3. Detail parameters (e.g., vibration amplitudes, vibration frequencies or vibration durations of the first vibration component and the second vibration component of the vibration pattern) of the vibration pattern can be calculated automatically by the host program of the immersive system 100 in some embodiments.

Another embodiment of present disclosure is a non-transitory computer-readable medium. The non-transitory computer-readable medium is configured to store computer program instructions 144 as shown in FIG. 1. When the computer program instructions 144 are executed by the processor 142, the computer program instructions 144 cause the processor 144 to perform aforesaid operations as shown in the control method 400 or 500 discussed in aforesaid embodiments.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An immersive system comprising:
 a processing device, communicated with an interface device and an electronic display, the interface device comprising a haptic feedback circuit configured to induce a haptic feedback, the processing device being configured to:
 perform an application program for providing a content to the electronic display;
 identify a first simulated object in the content corresponding to the interface device, wherein a movement of the interface device corresponds to a movement of the first simulated object in the content, wherein the application program provides a plurality of candidate interaction events associated with the first simulated object;
 identify an interaction event occurring between the first simulated object and a second simulated object in the content by selecting one of a plurality of candidate interaction events to be the interaction event, wherein the application program provides the plurality of candidate interaction events corresponding to the first simulated object and provides a plurality of basic vibration patterns with different waveforms corresponding to the candidate interaction events respectively to the processing device;
 determine a basic vibration pattern with a first waveform from the plurality of basic vibration patterns according to the interaction event, wherein the processing device determines the basic vibration pattern according the selected one of the candidate interaction events; and
 control the haptic feedback circuit to induce the haptic feedback according to the basic vibration pattern,
 wherein the interface device comprises a motion sensor configured to detect a spatial orientation of the interface device, the processing device acquires directions of a first axis and a second axis according to the spatial orientation detected by the motion sensor of the interface device, wherein in response to the interaction event, the processing device determines a force vector induced by the interaction event, and determines a degree of vibration of a first vibration component according to a component of the force vector on the first axis and a degree of vibration of second vibration component according to a component of the force vector on the second axis, and the haptic feedback circuit induces the haptic feedback with the first vibration component along the first axis according to the determined degree of vibration of the first vibration component and the basic vibration pattern with the first waveform, and the second vibration component along the second axis at the same time according to the determined degree of vibration of the second vibration component and the basic vibration pattern with the first waveform, wherein the application program provides at least two candidate interaction events, one of the at least two candidate interaction events is a collision event between the first simulated object and the second simulated object, and another one of the at least two candidate interaction events is a friction event of the first simulated object, and wherein a basic vibration pattern of the collision event has a waveform that vibration strength is gradually increased at first and gradually decreased, and a basic vibration pattern of the friction event has a waveform that vibration strength gets higher at beginning and remains steady during the rest of the friction event.

2. The immersive system of claim 1, wherein the haptic feedback circuit comprises a multiple-axes vibration actuator capable of vibrating at least along the first axis and the second axis, or the haptic feedback circuit comprises a first linear vibration actuator capable of vibrating along the first axis and a second linear vibration actuator capable of vibrating along the second axis, the second axis is different from the first axis.

3. The immersive system of claim 1, wherein the first vibration component along the first axis comprises a first vibration amplitude, a first vibration frequency or a first vibration duration, the second vibration component comprises a second vibration amplitude, a second vibration frequency or a second vibration duration.

4. The immersive system of claim 1, wherein the application program is developed by a provider different from a manufacturer of the immersive system.

5. The immersive system of claim 4, wherein vibration amplitudes, vibration frequencies or vibration durations of the first vibration component and the second vibration component of the basic vibration pattern are determined by the application program or a host program executed on the processing device, the host program is developed by the manufacturer of the immersive system.

6. The immersive system of claim 1, wherein the interface device comprises a hand-held controller, and the haptic feedback circuit induces the haptic feedback to a hand of a user.

7. The immersive system of claim 1, wherein the interface device comprises a wearable apparatus worn on a body portion of a user, and the haptic feedback circuit induces the haptic feedback to the body portion.

8. The immersive system of claim 1, wherein the selected one of the candidate interaction events is the collision event between the first simulated object and the second simulated object, and at least the second simulated object is in motion immediately prior to the collision event; and the force vector induced by the interaction event is determined according to at least a velocity of the second simulated object.

9. The immersive system of claim 1, wherein the processing device is further configured to determine a parameter of the first simulated object in the content, the parameter comprises a type a weight, a hardness, a resilience, or a material of the first simulated object in the content, and the force vector by the interaction event is further determined according to the parameter of the first simulated object.

10. A control method, suitable for an immersive system, the control method comprises:

providing a content by performing an application program;

identifying a first simulated object in the content corresponding to an interface device in the content, wherein a movement of the interface device in the content corresponds to a movement of the first simulated object;

identifying an interaction event occurring between the first simulated object and a second simulated object in the content by selecting one of a plurality of candidate interaction events to be the interaction event, wherein the application program provides the plurality of candidate interaction events corresponding to the first simulated object and provides a plurality of basic vibration patterns with different waveforms corresponding to the candidate interaction events respectively;

determining a basic vibration pattern with a first waveform from the plurality of basic vibration patterns according to the interaction event, wherein the basic vibration pattern with the first waveform is determined according the selected one of the candidate interaction events; and inducing a haptic feedback on the interface device according to the basic vibration pattern, wherein the interface device comprises a motion sensor configured to detect a spatial orientation of the interface device, the processing device acquires directions of a first axis and a second axis according to the spatial orientation detected by the motion sensor of the interface device, wherein in response to the interaction event, the processing device determines a force vector induced by the interaction event, and determines a degree of vibration of a first vibration component according to a component of the force vector on the first axis and a degree of vibration of second vibration component according to a component of the force vector on the second axis, and the haptic feedback circuit induces the haptic feedback with the first vibration component along the first axis according to the determined degree of vibration of the first vibration component and the basic vibration pattern with the first waveform, and the second vibration component along the second axis at the same time according to the determined degree of vibration of the second vibration component and the basic vibration pattern with the first waveform, wherein the application program provides at least two candidate interaction events, one of the at least two candidate interaction events is a collision event between the first simulated object and the second simulated object, and another one of the at least two candidate interaction events is a friction event of the first simulated object, and wherein a basic vibration pattern of the collision event has a waveform that vibration strength is gradually increased at first and gradually decreased, and a basic vibration pattern of the friction event has a waveform that vibration strength gets higher at beginning and remains steady during the rest of the friction event.

11. The control method of claim 10, wherein the first vibration component along the first axis comprises a first vibration amplitude, a first vibration frequency or a first vibration duration, the second vibration component comprises a second vibration amplitude, a second vibration frequency or a second vibration duration.

12. A non-transitory computer-readable medium comprising computer program instructions, the computer program instructions when executed by a processor cause the processor to perform operations comprising:

providing a content by performing an application program;

identifying a first simulated object in the content, the first simulated object corresponding to an interface device, wherein a movement of the interface device in the content corresponds to a movement of the first simulated object in the content;

identifying an interaction event occurring between the first simulated object and a second simulated object in the content by selecting one of a plurality of candidate interaction events to be the interaction event, wherein the application program provides the plurality of candidate interaction events corresponding to the first simulated object and provides a plurality of basic vibration patterns with different waveforms corresponding to the candidate interaction events respectively;

determining a basic vibration pattern with a first waveform from the plurality of basic vibration patterns according to the interaction event, wherein the basic vibration pattern with the first waveform is determined according the selected one of the candidate interaction events; and inducing a haptic feedback according to the basic vibration pattern, wherein the interface device comprises a motion sensor configured to detect a spatial orientation of the interface device, the processing device acquires directions of a first axis and a second axis according to the spatial orientation detected by the motion sensor of the interface device, wherein in response to the interaction event, the processing device determines a force vector induced by the interaction event, and determines a degree of vibration of a first vibration component according to a component of the force vector on the first axis and a degree of vibration of second vibration component according to a component of the force vector on the second axis, and the haptic feedback circuit induces the haptic feedback with the first vibration component along the first axis according to the determined degree of vibration of the first vibration component and the basic vibration pattern with the first waveform, and the second vibration component along the second axis at the same time according to the determined degree of vibration of the second vibration component and the basic vibration pattern with the first waveform, wherein the application program provides at least two candidate interaction events, one of the at least two candidate interaction events is a collision event between the first simulated object and the second simulated object, and another one of the at least two candidate interaction events is a friction event of the first simulated object, and wherein a basic vibration pattern of the collision event has a waveform that vibration strength is gradually increased at first and gradually decreased, and a basic vibration pattern of the friction event has a waveform that vibration strength gets higher at beginning and remains steady during the rest of the friction event.

* * * * *